(12) United States Patent
Yamada et al.

(10) Patent No.: US 11,514,631 B2
(45) Date of Patent: Nov. 29, 2022

(54) CONTROL METHOD

(71) Applicant: CANON KABUSHIKI KAISHA, Tokyo (JP)

(72) Inventors: Takayuki Yamada, Kawasaki (JP); Nobuhiro Kitabatake, Tokyo (JP); Shinjiro Hori, Yokohama (JP); Hiroyasu Kunieda, Yokohama (JP); Mizuki Hayakawa, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/937,429

(22) Filed: Jul. 23, 2020

(65) Prior Publication Data
US 2021/0042976 A1 Feb. 11, 2021

(30) Foreign Application Priority Data
Aug. 8, 2019 (JP) .............................. JP2019-146637

(51) Int. Cl.
*G06T 11/60* (2006.01)
(52) U.S. Cl.
CPC .................................... *G06T 11/60* (2013.01)
(58) Field of Classification Search
CPC ........................................................ G06T 11/60
See application file for complete search history.

(56) References Cited

U.S. PATENT DOCUMENTS

| | | | | |
|---|---|---|---|---|
| 7,339,598 B2* | 3/2008 | Schowtka | .................. | G06T 3/40 345/619 |
| 7,746,487 B2* | 6/2010 | Tsue | ..................... | H04N 1/3875 358/1.15 |
| 8,098,896 B2* | 1/2012 | Isomura | ................... | G06F 16/51 382/106 |
| 9,015,579 B2* | 4/2015 | Jin | ..................... | H04N 1/00132 715/243 |
| 9,299,177 B2* | 3/2016 | Sakai | ...................... | G06T 11/60 |
| 9,325,869 B2* | 4/2016 | Nagasaka | .......... | H04N 1/00458 |
| 9,509,870 B2* | 11/2016 | Kato | .................. | H04N 1/00442 |
| 9,846,681 B2* | 12/2017 | Hashii | ................... | G06F 16/958 |
| 9,852,325 B2* | 12/2017 | Sasaki | ................... | G06F 16/583 |
| 9,979,840 B2* | 5/2018 | Abe | ....................... | G06F 3/1208 |
| 10,115,216 B2* | 10/2018 | Ishida | ..................... | G06T 11/60 |
| 10,127,436 B2* | 11/2018 | Sasaki | ................ | G06K 9/00288 |
| 10,163,173 B1* | 12/2018 | McKinley | ............. | G06F 3/0484 |
| 10,225,415 B2* | 3/2019 | Abe | ........................ | G06F 3/1287 |
| 10,244,127 B2* | 3/2019 | Hayakawa | ........ | H04N 1/00177 |
| 10,275,652 B2* | 4/2019 | Yamamoto | ........ | H04N 1/00196 |
| 10,366,520 B2* | 7/2019 | Hayakawa | ........ | H04N 1/00137 |

(Continued)

FOREIGN PATENT DOCUMENTS

JP  2017-117406 A  6/2017

*Primary Examiner* — Shen Shiau

(74) *Attorney, Agent, or Firm* — Canon U.S.A., Inc. I.P. Division

(57) ABSTRACT

A control method for an image processing apparatus includes one or a plurality of specified pieces of image data and a plurality of evaluated templates. A plurality of layout images are generated by arranging the specified one or plurality of pieces of image data with respect to one or a plurality of slots included in each of the plurality of templates. At least one layout image out of the plurality of layout images is specified at least based on evaluations of the plurality of templates. The specified at least one layout image is output.

15 Claims, 18 Drawing Sheets

(56) References Cited

U.S. PATENT DOCUMENTS

| | | | |
|---|---|---|---|
| 10,402,057 B2* | 9/2019 | Hayakawa | H04N 1/00161 |
| 10,402,654 B2* | 9/2019 | Goto | G06T 7/62 |
| 10,403,014 B2* | 9/2019 | Kunieda | G06T 1/0007 |
| 10,460,494 B2* | 10/2019 | Kunieda | G06T 11/60 |
| 10,506,110 B2* | 12/2019 | Kunieda | G06K 9/628 |
| 10,545,656 B2* | 1/2020 | Ishida | G06F 3/04817 |
| 10,649,633 B2* | 5/2020 | Hori | G06T 11/60 |
| 10,659,626 B2* | 5/2020 | Hayakawa | H04N 1/00251 |
| 10,685,460 B2* | 6/2020 | Porecki | G06K 9/00677 |
| 10,708,446 B2* | 7/2020 | Kunieda | H04N 1/00137 |
| 10,902,047 B2* | 1/2021 | Hayakawa | G06F 7/36 |
| 10,904,473 B2* | 1/2021 | Hayakawa | H04N 5/14 |
| 10,917,529 B2* | 2/2021 | Yamada | H04N 1/00161 |
| 10,977,845 B2* | 4/2021 | Obayashi | G06T 11/60 |
| 11,107,260 B2* | 8/2021 | Yamada | G06K 9/036 |
| 2002/0051208 A1* | 5/2002 | Venable | H04N 1/387 358/1.18 |
| 2003/0058256 A1* | 3/2003 | Tanaka | G06T 11/60 345/619 |
| 2003/0147465 A1* | 8/2003 | Wu | H04N 5/262 375/240.11 |
| 2004/0120009 A1* | 6/2004 | White | H04N 5/232933 358/1.18 |
| 2005/0094207 A1* | 5/2005 | Lo | G06F 40/174 358/1.18 |
| 2006/0103891 A1* | 5/2006 | Atkins | H04N 1/00196 358/450 |
| 2006/0109517 A1* | 5/2006 | Catalan | H04N 1/3875 358/302 |
| 2006/0279555 A1* | 12/2006 | Ono | H04N 5/765 345/173 |
| 2007/0024909 A1* | 2/2007 | Hanechak | G06T 11/60 358/1.18 |
| 2008/0050039 A1* | 2/2008 | Jin | H04N 1/00196 382/284 |
| 2009/0022424 A1* | 1/2009 | Chen | H04N 1/00442 358/1.18 |
| 2009/0116752 A1* | 5/2009 | Isomura | G06T 11/60 382/217 |
| 2009/0287996 A1* | 11/2009 | Norimatsu | G06T 11/00 382/305 |
| 2010/0040286 A1* | 2/2010 | Matsuzawa | G06F 40/186 382/173 |
| 2010/0115434 A1* | 5/2010 | Yagi | G06F 8/38 715/810 |
| 2010/0164992 A1* | 7/2010 | Akiya | H04N 1/00461 345/641 |
| 2011/0261994 A1* | 10/2011 | Cok | G06T 11/60 382/100 |
| 2012/0113475 A1* | 5/2012 | Sugiyama | G06T 11/60 358/1.18 |
| 2012/0269434 A1* | 10/2012 | Atkins | B42D 1/08 382/175 |
| 2014/0009495 A1* | 1/2014 | Sakai | G06T 11/60 345/634 |
| 2014/0009793 A1* | 1/2014 | Tomioka | G06F 3/125 358/1.15 |
| 2014/0013217 A1* | 1/2014 | Hashii | G06F 40/106 715/253 |
| 2015/0062653 A1* | 3/2015 | Kato | H04N 1/00442 358/1.18 |
| 2015/0143256 A1* | 5/2015 | Panchawagh-Jain | G06Q 10/10 715/752 |
| 2015/0365547 A1* | 12/2015 | Yoshida | H04N 1/00 358/1.15 |
| 2017/0038930 A1* | 2/2017 | Hayakawa | H04N 1/6097 |
| 2017/0039745 A1* | 2/2017 | Hayakawa | H04N 1/00161 |
| 2017/0039747 A1* | 2/2017 | Ishida | G06T 1/0007 |
| 2017/0039748 A1* | 2/2017 | Kunieda | G06T 11/60 |
| 2017/0185843 A1* | 6/2017 | Goto | G06T 7/20 |
| 2017/0187892 A1* | 6/2017 | Abe | G06F 3/1208 |
| 2018/0068176 A1* | 3/2018 | Sasaki | G06F 16/9038 |
| 2018/0150446 A1* | 5/2018 | Sivaji | G06F 3/04845 |
| 2018/0164964 A1* | 6/2018 | Hori | G06F 3/0483 |
| 2018/0164984 A1* | 6/2018 | Kunieda | G06F 9/451 |
| 2018/0165856 A1* | 6/2018 | Kunieda | G06T 11/60 |
| 2018/0167522 A1* | 6/2018 | Kunieda | G06K 9/6232 |
| 2018/0217731 A1* | 8/2018 | Ishida | G06F 3/04817 |
| 2018/0217743 A1* | 8/2018 | Ishida | G06F 3/1201 |
| 2018/0220014 A1* | 8/2018 | Hayakawa | H04N 1/00251 |
| 2018/0220098 A1* | 8/2018 | Hayakawa | H04N 7/0255 |
| 2018/0234559 A1* | 8/2018 | Abe | H04N 1/00196 |
| 2019/0012820 A1* | 1/2019 | Furuya | H04N 1/00196 |
| 2019/0102398 A1* | 4/2019 | Hayakawa | G06F 16/4393 |
| 2019/0102926 A1* | 4/2019 | Obayashi | G06T 11/60 |
| 2019/0104222 A1* | 4/2019 | Kunieda | H04N 1/00143 |
| 2019/0116273 A1* | 4/2019 | Takeuchi | H04N 1/00461 |
| 2019/0174014 A1* | 6/2019 | Hayakawa | H04N 1/00196 |
| 2019/0325627 A1* | 10/2019 | Kunieda | G06T 11/60 |
| 2020/0143514 A1* | 5/2020 | Yadav | G06T 3/4038 |
| 2020/0279424 A1* | 9/2020 | Uratani | G06T 11/60 |
| 2020/0279425 A1* | 9/2020 | Yamada | G06T 7/0002 |
| 2020/0280639 A1* | 9/2020 | Yamada | H04N 1/00161 |
| 2020/0288023 A1* | 9/2020 | Hayakawa | H04N 1/00196 |
| 2020/0336607 A1* | 10/2020 | Kunieda | G06F 16/5854 |
| 2020/0336608 A1* | 10/2020 | Kunieda | H04N 1/00196 |
| 2021/0012501 A1* | 1/2021 | Saito | G06F 3/0482 |
| 2021/0042066 A1* | 2/2021 | Kitabatake | G06F 3/1243 |

\* cited by examiner

FIG.9A1
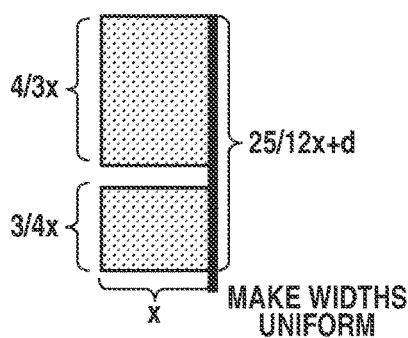
FIG.9A2
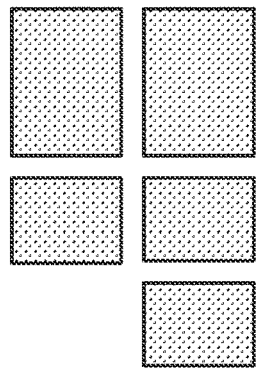
FIG.9A3
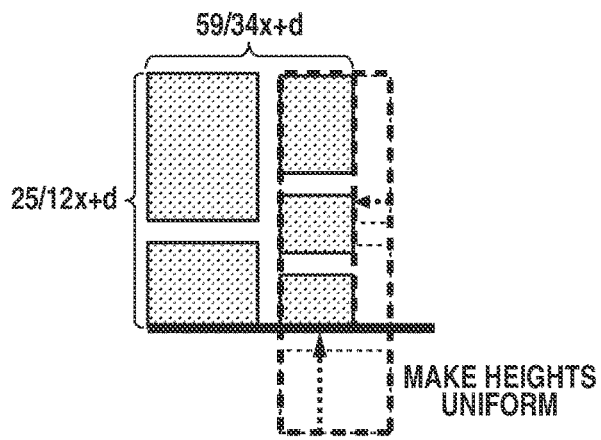
FIG.9A4
ENLARGE OR REDUCE SLOT REGION IN CONFORMITY WITH ARRANGEMENT REGION
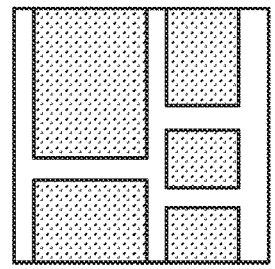
FIG.9B1
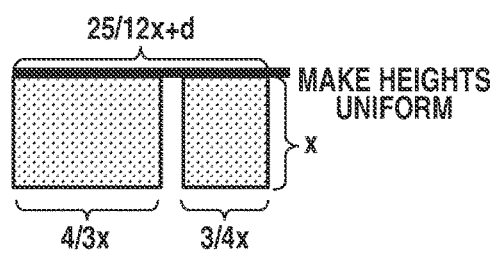
FIG.9B2
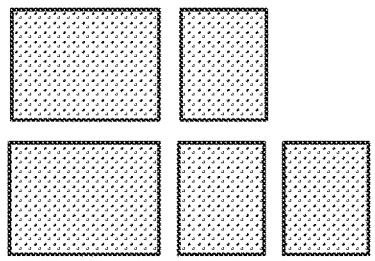
FIG.9B3
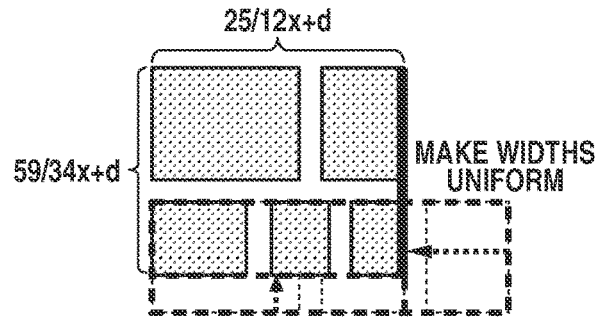
FIG.9B4
ENLARGE OR REDUCE SLOT REGION IN CONFORMITY WITH ARRANGEMENT REGION
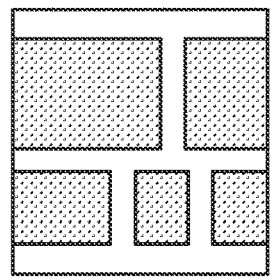

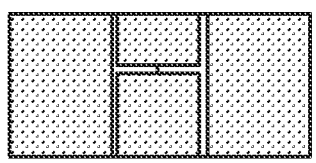
FIG.14A1
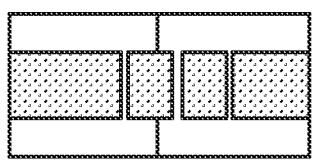
FIG.14A2
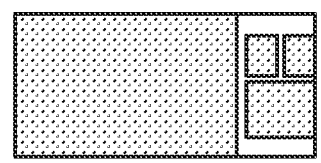
FIG.14A3
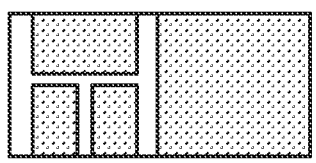
FIG.14A4
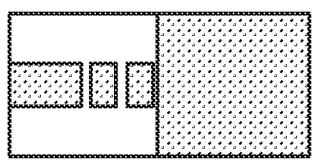
FIG.14A5
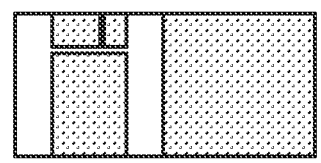
FIG.14A6
FIG.14B
| TEMPLATE | SCOREarea | SCOREgap | TEMPLATE SCORE |
|---|---|---|---|
| FIG.14A1 | 1 | 1 | 1 |
| FIG.14A2 | 0 | 1 | 0.5 |
| FIG.14A3 | 1 | 0.4 | 0.7 |
| FIG.14A4 | 1 | 1 | 1 |
| FIG.14A5 | 0.4 | 0.6 | 0.5 |
| FIG.14A6 | 0.8 | 0 | 0.4 |
FIG.14C
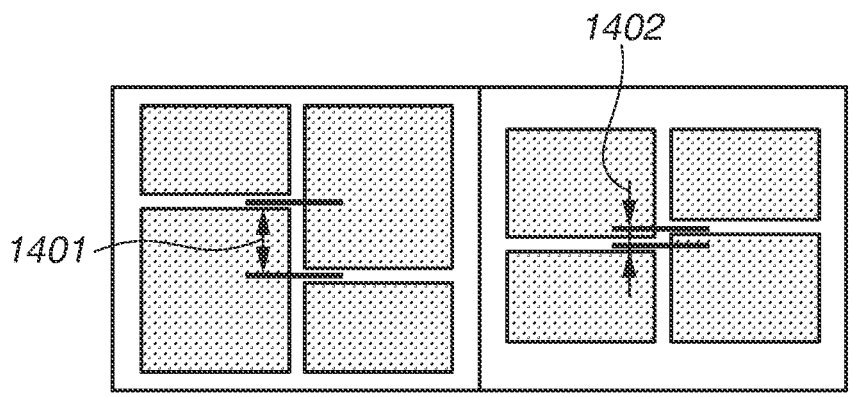

FIG.16A
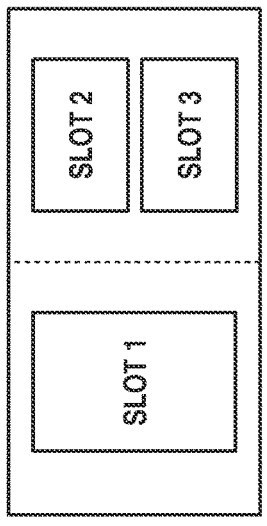
FIG.16B
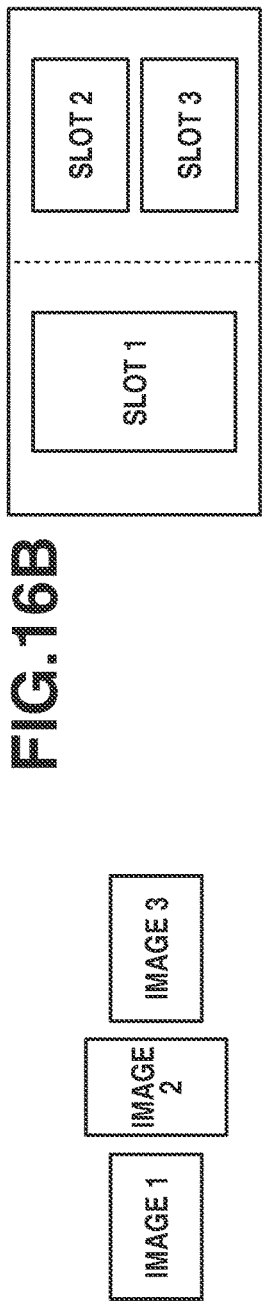
FIG.16C
| IMAGE No. | ASPECT RATIO | IMAGE SCORE | IMAGE CAPTURING TIME |
|---|---|---|---|
| 1 | 3:2 | 0.8 | 15:00 |
| 2 | 2:3 | 0.5 | 15:02 |
| 3 | 3:2 | 0.6 | 15:10 |
| SLOT No. | ASPECT RATIO | SLOT SCORE | POSITION No. |
|---|---|---|---|
| 1 | 2:3 | 3 | 1 |
| 2 | 3:2 | 2 | 2 |
| 3 | 3:2 | 2 | 3 |
FIG.16D
| IMAGE No. | ASPECT RATIO | IMAGE SCORE | IMAGE CAPTURING TIME |
|---|---|---|---|
| 1 | 3:2 | 0.8 | 15:00 |
| 3 | 3:2 | 0.6 | 15:10 |
| 2 | 2:3 | 0.5 | 15:02 |
| SLOT No. | ASPECT RATIO | SLOT SCORE | POSITION No. |
|---|---|---|---|
| 2 | 3:2 | 2 | 2 |
| 3 | 3:2 | 2 | 3 |
| 1 | 2:3 | 3 | 1 |
FIG.16E
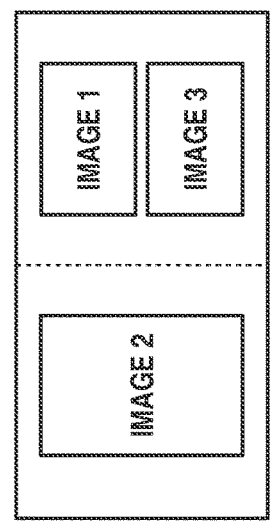

FIG.17A
TEMPLATE 1
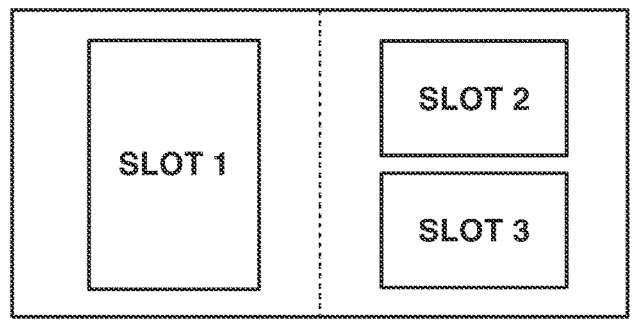
FIG.17B
TEMPLATE 2
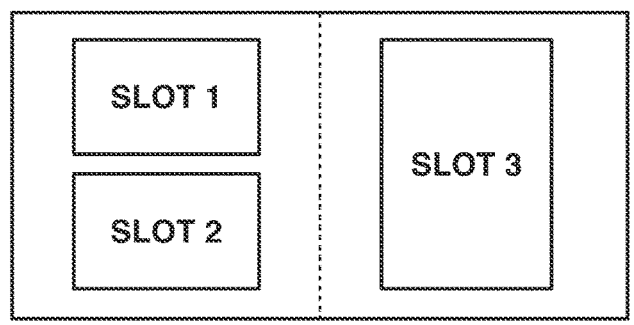
FIG.17C
| IMAGE No. | ASPECT RATIO | IMAGE SCORE | IMAGE CAPTURING TIME |
|---|---|---|---|
| 1 | 3:2 | 0.8 | 15:00 |
| 3 | 3:2 | 0.6 | 15:10 |
| 2 | 2:3 | 0.5 | 15:02 |
1701
| TEMPLATE 1 | | | |
|---|---|---|---|
| SLOT No. | ASPECT RATIO | SLOT SCORE | POSITION No. |
| 2 | 3:2 | 2 | 2 |
| 3 | 3:2 | 2 | 3 |
| 1 | 2:3 | 3 | 1 |
1702
| TEMPLATE 2 | | | |
|---|---|---|---|
| SLOT No. | ASPECT RATIO | SLOT SCORE | POSITION No. |
| 1 | 3:2 | 2 | 1 |
| 2 | 3:2 | 2 | 2 |
| 3 | 2:3 | 3 | 3 |
1703

CONTROL METHOD

BACKGROUND

Field

Aspects of the present disclosure generally relate to a control method.

Description of the Related Art

There is a known technique to generate a layout image by arranging pieces of image data in a template, as discussed in Japanese Patent Application Laid-Open No. 2017-117406.

Furthermore, heretofore, there is a matter in which, due to the evaluation of templates for use in generating a layout image not having ever been performed, a layout image with a template low in aesthetic property used therein might be output.

SUMMARY

Aspects of the present disclosure are generally directed to a control method capable of outputting a layout image with a template high in aesthetic property used therein.

According to an aspect of the present disclosure, a control method for an image processing apparatus includes specifying one or a plurality of pieces of image data, evaluating a plurality of templates, generating a plurality of layout images by arranging the specified one or plurality of pieces of image data with respect to one or a plurality of slots included in each of the plurality of templates, specifying at least one layout image out of the plurality of layout images at least based on evaluations of the plurality of templates, and outputting the specified at least one layout image.

Further features of the present disclosure will become apparent from the following description of exemplary embodiments with reference to the attached drawings.

BRIEF DESCRIPTION OF THE DRAWINGS

FIGS. 9A1, 9A2, 9A3, 9A4, 9B1, 9B2, 9B3, and 9B4 are diagrams used to explain a layout method for slots.

FIGS. 14A1, 14A2, 14A3, 14A4, 14A5, 14A6, 14B, and 14C are diagrams used to explain scoring for templates.

FIGS. 16A, 16B, 16C, 16D, and 16E are diagrams used to explain a layout method for pieces of image data.

FIGS. 17A, 17B, and 17C are diagrams used to explain scoring for layout images.

DESCRIPTION OF THE EMBODIMENTS

Various exemplary embodiments, features, and aspects of the disclosure will be described in detail below with reference to the drawings. Furthermore, the following exemplary embodiments are not intended to limit the disclosure set forth in the claims, and not all of the combinations of characteristics described in the following exemplary embodiments are necessarily essential for solutions in the disclosure.

In the following exemplary embodiments, a procedure for causing an application program for album creation (hereinafter referred to as an "album creation application") to run on an image processing apparatus and thus performing automatic layout processing to generate a layout image is described. Unless otherwise stated, the term "image" as used in the following description includes a still image, a moving image, and a frame image included in a moving image and further includes a still image, a moving image, and a frame image included in a moving image existing on a social networking service (SNS) server.

Figure 1:
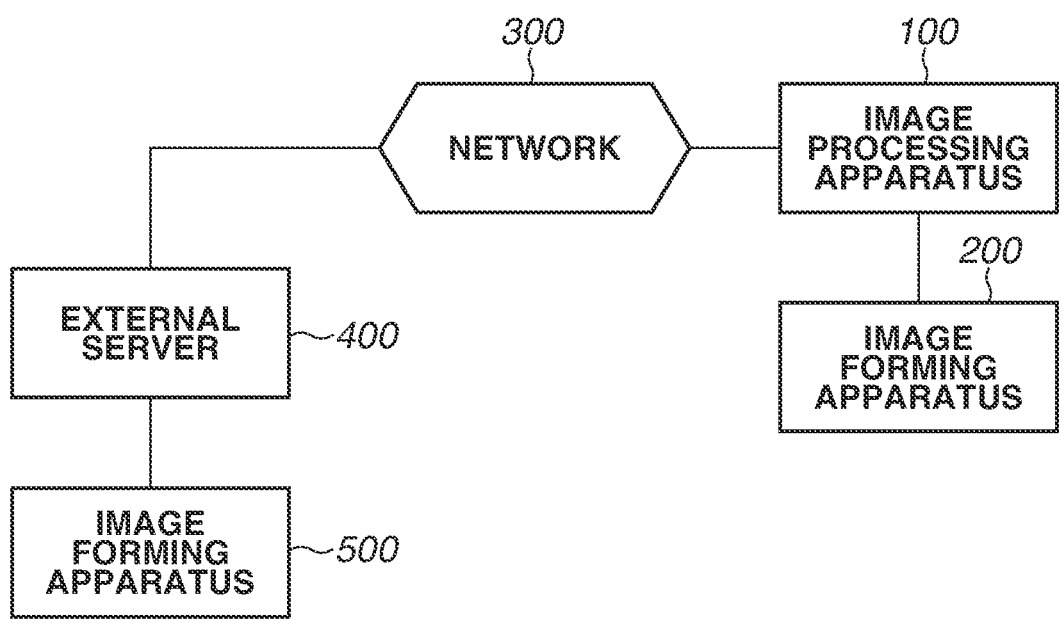
FIG. 1 is a diagram illustrating a printing system according to an exemplary embodiment of the present disclosure.

FIG. 1 is a diagram illustrating a printing system according to an exemplary embodiment of the present disclosure. The printing system is assumed to include, in addition to an image processing apparatus 100, an image forming apparatus 200, a network 300, an external server 400, and an image forming apparatus 500.

The image processing apparatus 100 is an apparatus which generates album data with an album creation application. In the present exemplary embodiment, the album data is data which is used to order and produce an album, and is data which is configured with a plurality of pieces of layout information. The layout information is information used to print a layout image, which is arranged for printing on a spread (facing page) included in an album. In the present exemplary embodiment, with automatic layout processing described below, album data or layout information is able to be automatically generated by the album creation application. Furthermore, the image processing apparatus 100 is, for example, a personal computer (PC), a smartphone, a tablet terminal, a camera, or a printer, and is, in the present exemplary embodiment, assumed to be a PC.

The image forming apparatus 200 performs image formation processing (print processing) for forming an image on a recording medium with a recording agent based on a print job received from, for example, the image processing apparatus 100. Furthermore, while, in the present exemplary embodiment, a configuration in which the image processing apparatus 100 transmits (outputs) the generated layout information to an external server is described, for example, a configuration in which the image processing apparatus 100 transmits the generated layout information as a print job to the image forming apparatus 200 can be employed. In this case, an album which is based on the layout information is created by the image forming apparatus 200. Furthermore, the printing method which the image forming apparatus 200 uses is not specifically limited, and can be, for example, an inkjet method, an electrophotographic method, or a thermal sublimation method.

The network 300 is connected to the image processing apparatus 100 and the external server 400, and is a communication network used to perform transfer of information between the image processing apparatus 100 and the external server 400. Furthermore, the network 300 can be a wired network or can be a wireless network.

The external server 400 receives layout information described below from the image processing apparatus 100 via the network 300. Thus, the external server 400 is a server which serves to accept and manage orders for albums. In response to a purchase order procedure for an album being performed by a user who operates the image processing apparatus 100, the external server 400 causes the image forming apparatus 500 to perform image formation processing to create an album that is based on the received layout information. After that, the album created by the image forming apparatus 500 is delivered to the user who has performed the album purchase procedure.

Figure 2:
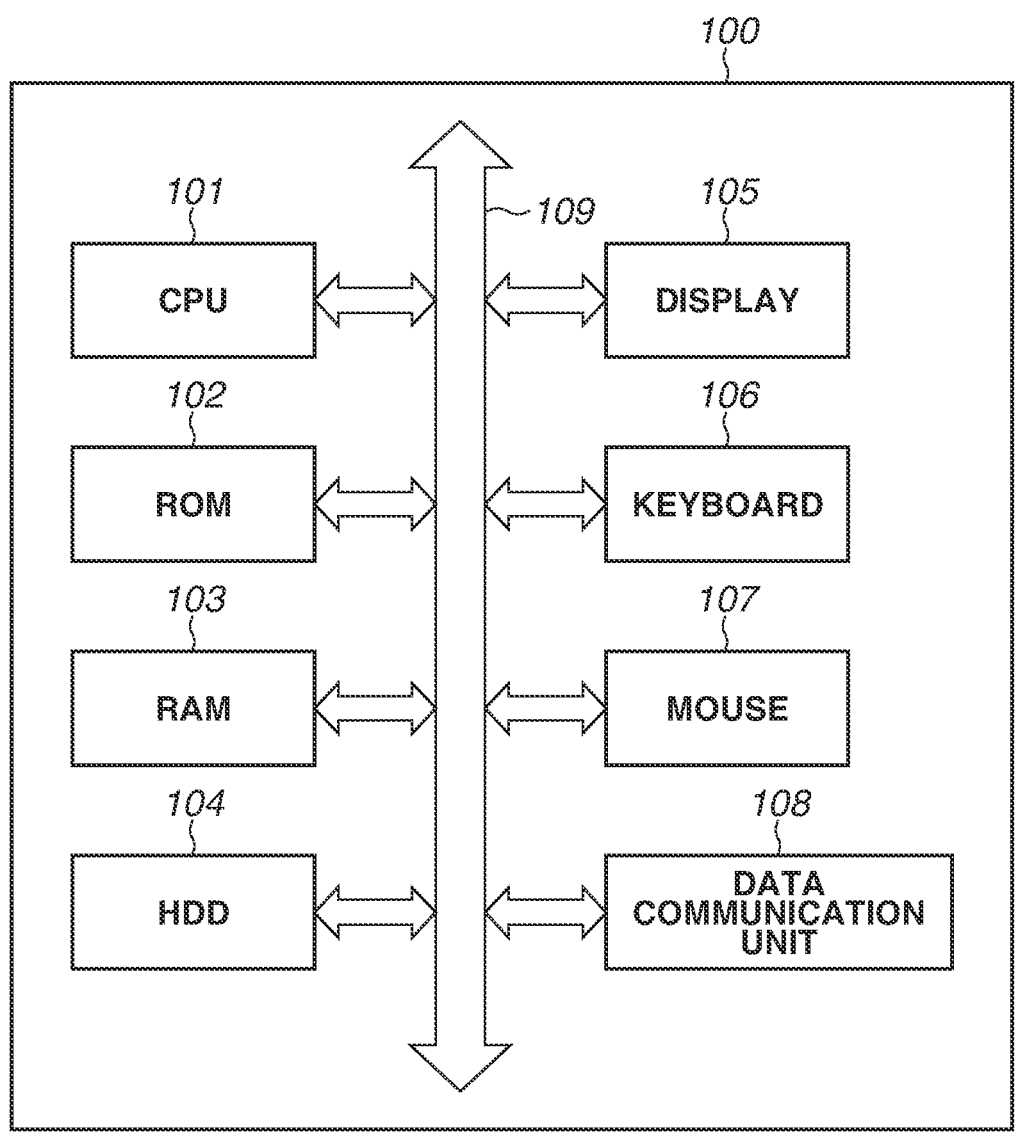
FIG. 2 is a diagram illustrating a configuration of hardware of an image processing apparatus.

FIG. 2 is a block diagram illustrating a configuration of hardware of the image processing apparatus 100 according to the present exemplary embodiment. Referring to FIG. 2, the image processing apparatus 100 includes a central processing unit (CPU) 101, a read-only memory (ROM) 102, a random access memory (RAM) 103, a hard disk drive (HDD) 104, a display 105, a keyboard 106, a mouse 107, and a data communication unit 108. These elements are mutually interconnected via a data bus 109. Then, a computer of the image processing apparatus 100 is configured with, for example, the CPU 101, ROM 102, and the RAM 103.

The CPU 101, which is a central arithmetic device or a processor, is a system control unit that controls the entire image processing apparatus 100. Moreover, the CPU 101 performs an image processing method described in the present exemplary embodiment according to a program. Furthermore, while, in FIG. 2, only one CPU is illustrated, the CPU 101 is not limited to this, but can include a plurality of CPUs.

Programs and an operating system (OS) which are executed by the CPU 101 are stored in the ROM 102. The RAM 103 provides a memory for temporarily storing various pieces of information to be used when programs are executed by the CPU 101. The HDD 104 is a storage medium for storing, for example, a database which retains image files and results of processing, such as image analysis. In the present exemplary embodiment, the RAM 103 stores an album creation application described below.

The display 105 (display unit) is a device which displays a user interface (UI) in the present exemplary embodiment or a layout result of images to the user. The display 105 can be equipped with a touch sensor function. The keyboard 106 is one of input devices, and is used, for example, to input predetermined information onto a UI displayed on the display 105. The predetermined information is, for example, information indicating the number of spreads or the number of pages of an album intended to be created. The mouse 107 is one of input devices, and is used, for example, to click a button on the UI displayed on the display 105. Furthermore, the album creation application is activated, for example, by the user operating the mouse 107 to double-click an icon corresponding to the album creation application, which is displayed on the display 105.

The data communication unit 108 (communication unit) is a device provided to communicate with an external apparatus, such as a printer or a server. For example, data generated by the album creation application is transmitted via the data communication unit 108 to a printer (not illustrated) or a server (not illustrated) connected to the image processing apparatus 100. Moreover, the data communication unit 108 receives still image data present on a server (not illustrated) or a social networking service (SNS) server (not illustrated). Furthermore, while, in the present exemplary embodiment, the data communication unit 108 receives still image data from an SNS server, but the data communication unit 108 can also receive moving image data.

The data bus 109 connects the above-mentioned units (102 to 108) to the CPU 101.

<Automatic Layout of Album>

When the album creation application in the present exemplary embodiment is installed on the image processing apparatus 100, a start-up icon for the album creation application is displayed on a top screen (desktop) of the OS running on the image processing apparatus 100. When the use double-clicks the start-up icon on the desktop displayed on the display 105 with the mouse 107, the album creation application, which is stored in the HDD 104, is loaded onto the RAM 103. Then, the album creation application loaded on the RAM 103 is executed by the CPU 101, so that the album creation application is activated.

In the present exemplary embodiment, the album creation application performs automatic layout processing, which is processing for generating a layout image by automatically specifying a template and arranging images in the specified template. Furthermore, with the layout image being generated, layout information for outputting (displaying or printing) the layout image is also generated. Therefore, the automatic layout processing is also processing for automatically generating layout information. However, a conventional template which is automatically specified is a template which is stored beforehand in an album creation application and in which the shapes, sizes, and positions of respective slots are previously determined, and, therefore, may be a template which is inappropriate for image data to be arranged. Specifically, for example, there is a matter in which the aspect ratio of image data to be arranged and the aspect ratio of a slot in the template greatly differ from each other and, therefore, the aesthetic property of arranged image data decreases. Therefore, the present exemplary embodiment is configured to perform processing for generating a template appropriate for image data to be arranged.

Moreover, during conventional automatic layout, a plurality of pieces of layout information is generated and evaluated and layout information which is to be actually used is determined based on such evaluation. However, in conventional evaluation of layout information, evaluation of a template which is used in layout information is not taken into consideration. Therefore, the present exemplary embodiment is configured to perform evaluation of a template which is used in layout information. Then, in selecting layout information to be actually used, the present exemplary embodiment is configured to refer to the evaluation of a template which is used in layout information.

<Screen which Album Creation Application Displays>

Figure 3:
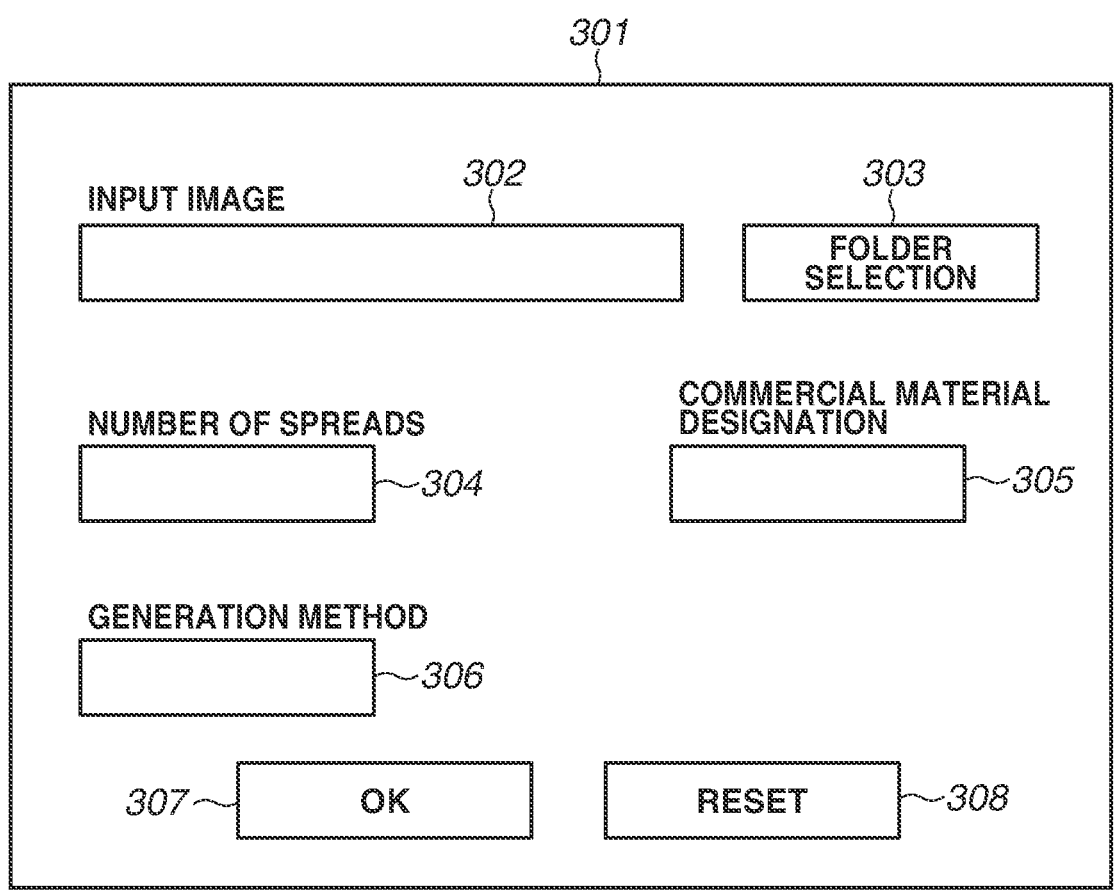
FIG. 3 is a diagram illustrating an example of an input screen which an album creation application provides.

FIG. 3 is a diagram illustrating an example of an input screen 301 which the album creation application as activated provides. The input screen 301 is displayed on the display 105. In response to the user setting a creation condition for albums described below via the input screen 301, the album creation application acquires the setting contents designated by the user.

A path box 302 on the input screen 301 represents a storage location (path) in the HDD 104 for an image data group targeted for album creation. When a folder selection button 303 is clicked by the mouse 107 being operated by the user, a folder including an image data group targeted for album creation is displayed in a tree structure in such a manner as to be able to be selected by the user. Then, a folder path including an image data group selected by the user is displayed in the path box 302. Furthermore, while, in the present exemplary embodiment, a configuration in which designation of image data targeted for album creation is performed by designating a folder storing the image data is described, the present exemplary embodiment is not limited to this configuration. A configuration in which the user is allowed to select which image data out of pieces of image data stored in a folder to target for album creation can also be employed.

A number of spreads box 304 is a box used to receive, from the user, setting of the number of spreads in an album. The user is allowed to directly enter numerals in the number of spreads box 304 with use of the keyboard 106 or enter numerals in the number of spreads box 304 from a list with use of the mouse 107. Furthermore, the term "spread" may mean a region for two pages facing each other in an album. Here, the number of spreads in each of which a layout image, which is an image including images arranged in a template, is printed (in other words, the number of spreads included in the body of an album) is input.

A commercial material designation box 305 is used to receive setting of a commercial material which is used for an album to be created with album data. Specifically, the setting of a commercial material is setting of, for example, the size of an album, the paper type of covers of an album, and the paper type of pages other than convers of an album. Moreover, for example, the setting of a commercial material can include setting of a method of binding an album to be created with album data.

A generation method designation box 306 is used to receive setting of a generation method for album data. In the present exemplary embodiment, the generation method for album data is assumed to include automatic generation and manual generation. Details of them are described below.

An OK button 307 is a button used to start generation of album data based on information input via the input screen 301.

A reset button 308 is a button used to reset each piece of setting information on the input screen 301.

Furthermore, on the input screen 301, settings other than the above-mentioned settings can be configured to be feasible. For example, setting concerning a moving image or setting of an acquisition destination of still image or moving image data can be configured to be feasible. Moreover, for example, setting of a main character for an album can be configured to be feasible. In a case where a main character is set for an album, generation of album data is controlled in such a manner that a larger number of images in which a person set as the main character is shown are included in the album. Moreover, for example, setting of modes for an album can be configured to be feasible. The modes for an album are modes for preferentially laying out an image containing a predetermined object in a template, and, in an album set to each mode, a larger number of images in which an object corresponding to each mode is shown are arranged. The modes to be set in this manner include, for example, modes "person", "animal", and "food". Moreover, a screen such as that illustrated in FIG. 3 can include a region representing, for example, a conceptional completion drawing of an album represented by layout information which is generated by the input settings.

In the present exemplary embodiment, in a case where automatic generation is selected as the generation method for an album, the album creation application automatically generates album data according to the condition input via the input screen 301, and then displays an editing screen for the automatically generated album data. On the other hand, in a case where manual generation is selected as the generation method for an album, the album creation application displays an editing screen for album data in which image data is not arranged, and then receives a user's selection on the editing screen, thus arranging image data in the album data.

Figure 5:
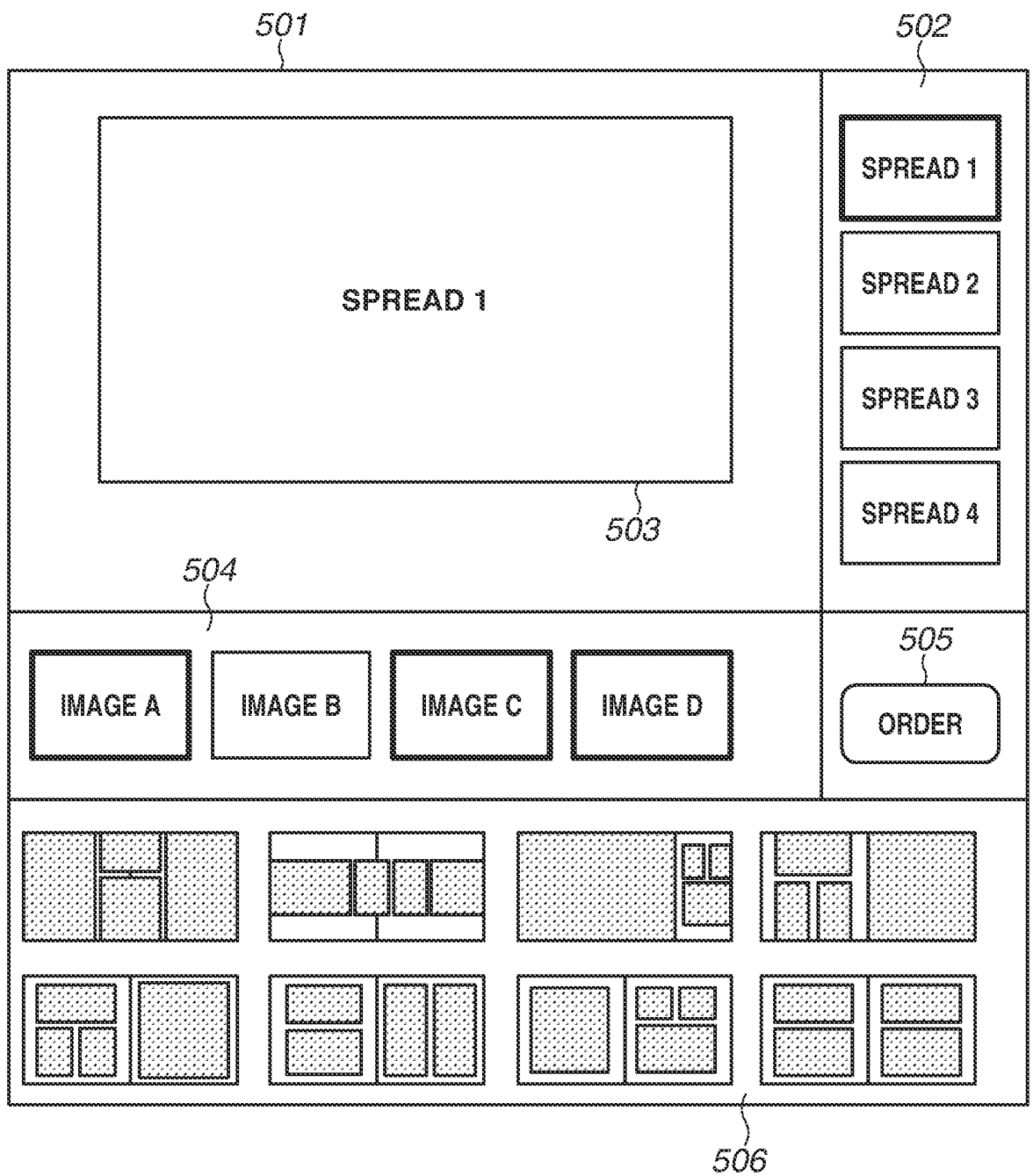
FIG. 5 is a diagram illustrating an example of an editing screen which the album creation application provides.

FIG. 5 is a diagram illustrating an example of an editing screen 501 which the album creation application provides. The editing screen 501 includes a spread list 502, a spread display portion 503, an image list 504, an order button 505, and a candidate display region 506.

A list of spreads serving as candidates for selection is displayed in the spread list 502. The user is allowed to select a spread by clicking, with the mouse 107, any one of the spreads included in the spread list 502.

A spread selected from the spread list 502 is displayed in the spread display portion 503. Furthermore, in a case where a layout image corresponding to the selected spread has been generated upon completion of automatic layout processing, such a generated layout image is displayed in the spread display portion 503.

Furthermore, the spread list 502 or the spread display portion 503 is not limited in respect of the form of displaying a spread, and can employ, for example, the form of displaying a region for one page. Moreover, the spread list 502 or the spread display portion 503 can be configured to switch between the state of representing a spread and the state of representing a page. In this case, for example, the spread list 502 or the spread display portion 503 displays a front cover and a back cover in the state of representing one page and displays the body in the state of representing one spread.

A list of thumbnail images represented by pieces of image data corresponding to respective paths each designated in the path box 302 (i.e., pieces of image data selected by the user) is displayed in the image list 504. Image data corresponding to a thumbnail image selected from the image list 504 is arranged in a spread displayed in the spread display portion 503. More specifically, the user is allowed to designate image data to be arranged in a spread displayed in the spread display portion 503, by clicking, with the mouse 107, any one of thumbnail images included in the image list 504. Furthermore, at this time, the user can select a plurality of thumbnail images. Moreover, a thumbnail image represented by image data other than the image data selected by the user via the path box 302 can be added to the image list 504. For example, new image data is added to the image list 504 by dragging and dropping image data from any folder into the image list 504. Furthermore, in a case where image data has been added to the image list 504, analysis of the added image data is performed as described below in step S403.

The order button 505 is a button used to order an album that is based on the generated album data. In a case where the order button 505 has been pressed, after the user performs a predetermined ordering procedure, album data is transmitted to the external server 400.

The candidate display region 506 is a region in which to display candidates for a template which is used for generation of a layout image to be arranged in a spread displayed in the spread display portion 503. Details of an operation to be performed on the candidate display region 506 are described below.

Furthermore, while, in FIG. 5, no layout image is displayed in the spread list 502 and the spread display portion 503, in a case where a layout image is arranged in a spread by, for example, automatic layout processing, the layout image is displayed in the spread list 502 and the spread display portion 503.

<Automatic Layout Processing>

In the following description, first, automatic layout processing which is performed in response to automatic generation being selected as a generation method for album data is described.

Figure 4:
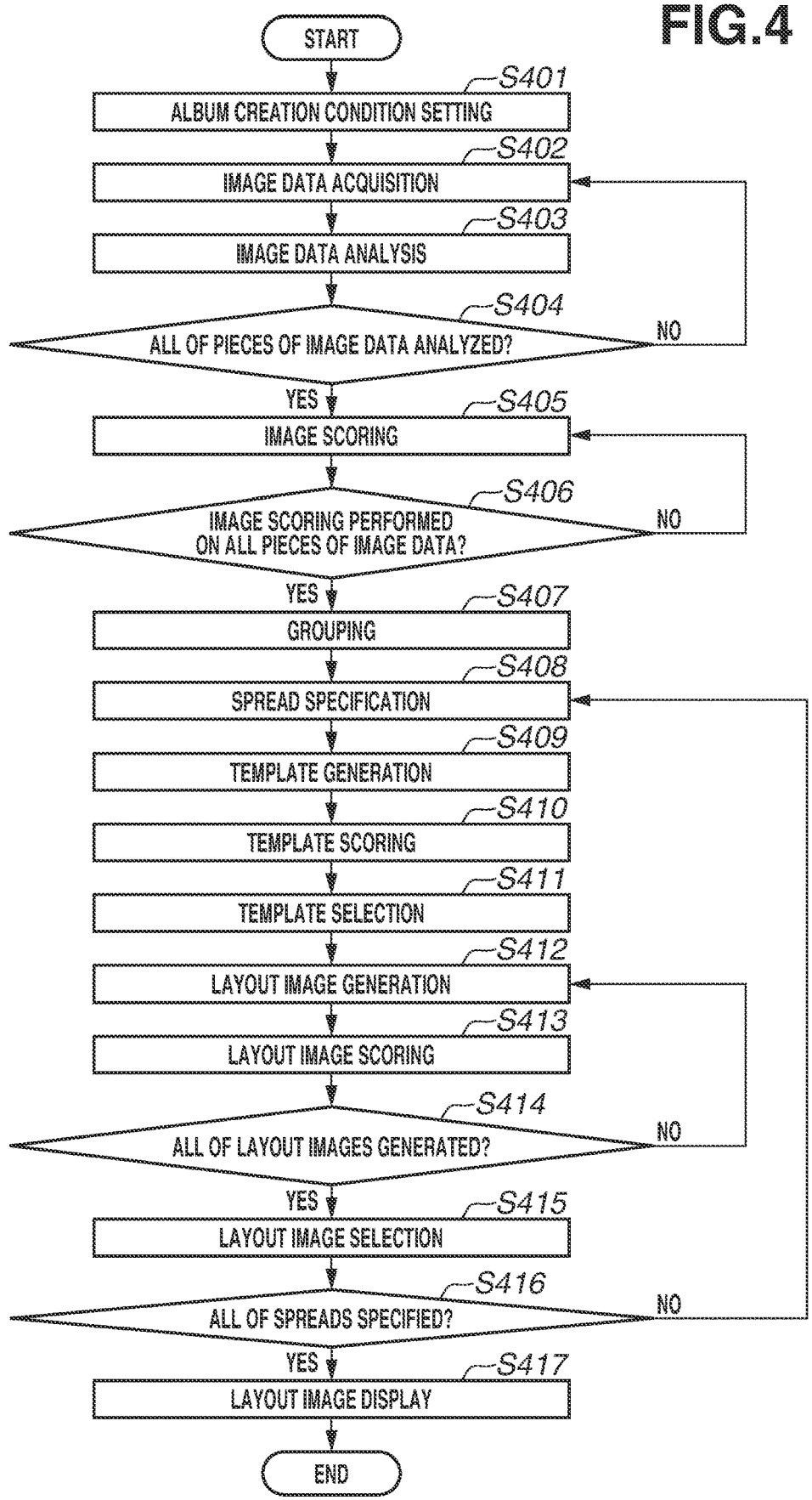
FIG. 4 is a flowchart illustrating automatic layout processing which is performed by the album creation application.

FIG. 4 is a flowchart illustrating automatic layout processing which is performed by the album creation application according to the present exemplary embodiment. The flowchart illustrated in FIG. 4 is implemented, for example, by the CPU 101 loading a program corresponding to the album creation application stored in the HDD 104 onto the ROM 102 or the RAM 103 and executing the program. Moreover, the flowchart illustrated in FIG. 4 is started when the OK button 307 has been operated with automatic generation selected as the generation method for album data.

First, in step S401, the CPU 101 acquires various pieces of information about an album creation condition input via the input screen 301.

In step S402, the CPU 101 refers to the pieces of information acquired in step S401 and thus acquires image data included in a folder corresponding to a path designated via the path box 302.

In step S403, the CPU 101 analyzes the image data acquired in step S402. Specifically, the CPU 101 performs extraction processing for feature amounts, object detection processing, and face detection processing. Moreover, the CPU 101 acquires the size and the image capturing date and time of an image from metadata (e.g., Exif information) associated with image data.

The extraction processing for feature amounts is described. Examples of the feature amounts include the focus of an image represented by image data. As a method of detecting edges to acquire the feature amount in focus, for example, a general Sobel filter is used. The gradient of an edge, i.e., luminance gradient, is able to be calculated by detecting the edge with use of the Sobel filter and dividing a luminance difference between a starting point and an ending point of the edge by a distance between the starting point and the ending point. From the result of calculating an average gradient of edges in the image, an image having a large average gradient can be deemed to be more in focus than an image having a small average gradient. Then, if a plurality of respective different threshold values are set with respect to gradients, determining which threshold value the target gradient is greater than or equal to enables outputting an evaluation value about the amount of focus. In the present exemplary embodiment, two different threshold values are previously set, and the amount of focus is determined in three levels of "○", "Δ", and "x". The threshold values are previously set by, for example, experiments in such a manner that a gradient of focus desirable to be employed in an album is rated as "○", a gradient of focus allowable to be employed in an album is rated as "Δ", and a gradient of focus unallowable to be employed in an album is rated as "x". Furthermore, the setting of threshold values can be provided by, for example, the creation source of the album creation application, or threshold values can be configured to be able to be set on a user interface. Moreover, as feature amounts, in the present exemplary embodiment, information about, for example, the image capturing date and time of image data and the size and aspect ratio of an image represented by image data is extracted.

The face detection processing and the object detection processing are described. The CPU 101 performs face detection processing to detect the face of a person from an image represented by image data acquired in step S402. To perform processing for face detection, a method can be used, and, for example, AdaBoost, in which a strong classifier is generated from a plurality of previously-prepared weak classifiers, is used. In the present exemplary embodiment, the face image of a person (object) is detected by a strong classifier generated according to AdaBoost. Moreover, the CPU 101 not only extracts the face image but also acquires the upper left coordinate values and lower right coordinate values of the position of the detected face image. Acquiring such two types of coordinates enables the CPU 101 to acquire the position of the face image and the size of the face image. Moreover, the CPU 101 performs object detection processing to detect a predetermined object other than face images with use of a strong classifier generated according to Adaboost. Furthermore, in the present exemplary embodiment, the object to be detected in the object detection processing is assumed to be an animal such as a dog or cat. The object is not limited to an animal such as a dog or cat, and other objects such as a flower, food, a building, a stationary article, or a vehicle can be detected. Moreover, the CPU 101 can search for an object with use of not AdaBoost but, for example, a deep neural network.

Furthermore, pieces of image analysis information acquired in step S403 about respective pieces of image data are stored in the HDD 104 in a discriminable manner with respective identifiers (IDs) for discriminating images.

In step S404, the CPU 101 determines whether analyzing of all of the pieces of image data acquired in step S402 has been completed. If the result of determination is YES (YES in step S404), the CPU 101 advances the processing to step S405, and, if the result of determination is NO (NO in step S404), the CPU 101 returns the processing to step S402, thus acquiring image data not yet subjected to analysis.

In step S405, the CPU 101 performs image scoring. The image scoring in step S405 refers to processing for assigning a score (scoring) evaluated based on an analysis result obtained in step S403 for each piece of image data. In the present exemplary embodiment, image scoring is performed in a plurality of viewpoints based on the analysis result obtained in step S403. In other words, in the present exemplary embodiment, a plurality of scores is assigned to each piece of image data by image scoring. Specifically, in the present exemplary embodiment, scores in two viewpoints, i.e., a score that is based on the feature amount (particularly, image quality) and a score that is based on the face detection result, are assigned to each piece of image data.

First, image scoring that is based on image quality is described. In the present exemplary embodiment, for example, in image scoring that is based on image quality, a feature amount of, for example, focus or the number of pixels is used. Specifically, for example, a score that is based on image quality is assigned in such a manner that a score assigned to image data in which the feature amount of focus acquired in step S403 is at level "○" becomes higher than a score assigned to image data in which the feature amount of focus acquired therein is at level "Δ" or "x". Moreover, for example, a score that is based on image quality is assigned to each piece of image data in such a manner that a score assigned to image data representing an image having a large number of pixels becomes higher than a score assigned to image data representing an image having a small number of pixels. Furthermore, a feature amount for use in image scoring that is based on image quality can be image capturing information such as lens information used at the time of image capturing, or can be a compression format of images to be input to an application. Moreover, such a feature amount can also be, for example, the size, resolution, or contrast of an image which is displayed based on image data.

Next, image scoring that is based on a face detection result is described. This image scoring is performed based on, for example, information indicating whether the face of a person has been detected in step S403 or information about the size of the face detected in step S403. For example, scores are assigned to the respective pieces of image data in such a manner that a score assigned to image data in which the face of a person is included becomes higher than a score assigned to image data in which the face of any person is not included. Moreover, for example, scores are assigned to the respective pieces of image data in such a manner that a score assigned to image data in which the area (size) occupied by the face of a person is large becomes higher than a score assigned to image data in which the area occupied by the face of a person is small. Moreover, for example, scores are assigned to the respective pieces of image data in such a manner that a score assigned to image data in which a smiley face is included becomes higher than a score assigned to image data in which an unsmiley face is included.

Next, image scoring that is based on an object detection result is described. This image scoring is performed based on, for example, information indicating whether an animal has been detected in step S403 or information about the size of an animal detected in step S403. For example, scores are assigned to the respective pieces of image data in such a manner that a score assigned to image data in which an animal is included becomes higher than a score assigned to image data in which no animal is included. Moreover, for example, scores are assigned to the respective pieces of image data in such a manner that a score assigned to image data in which the area (size) occupied by an animal is large becomes higher than a score assigned to image data in which the area occupied by an animal is small.

In step S406, the CPU 101 determines whether image scoring in step S405 has been completed with respect to all of the pieces of image data acquired in step S402. If the result of determination is YES (YES in step S406), the CPU 101 advances the processing to step S407. Moreover, if the result of determination is NO (NO in step S406), the CPU 101 returns the processing to step S405, thus performing image scoring on image data not yet subjected to image scoring.

In step S407, the CPU 101 groups the pieces of image data acquired in step S402. Furthermore, grouping is performed in such a manner that the number of groups generated in step S407 becomes equal to the number of spreads input to the number of spreads box 304. At this time, specifically, first, the CPU 101 arranges the pieces of image data acquired in step S402 in order of earlier image capturing date and time based on the feature amounts (image capturing dates and times) obtained by analysis performed in step S403. After that, the CPU 101 acquires temporal differences in image capturing time of respective intervals between pieces of image data. Then, the CPU 101 groups the pieces of image data by partitioning a sequence of the pieces of image data in order starting with an interval between pieces of image data having the largest temporal distance. After that, the CPU 101 allocates the thus-grouped pieces of image data to respective spreads targeted for generation in time-series order. More specifically, the CPU 101 allocates a group including image data the image capturing date and time is earlier to a spread the page number of which is smaller. This enables specifying which pieces of image data to arrange in respective spreads.

In step S408, the CPU 101 specifies a spread targeted for automatic layout out of spreads not yet subjected to automatic layout. In the present exemplary embodiment, a spread the page number of which is smaller is assumed to be specified out of spreads not yet subjected to automatic layout. Furthermore, at this time, the CPU 101 acquires, for example, pieces of image data to be arranged in the specified spread and image analysis results of the pieces of image data.

In step S409, the CPU 101 generates a template to be used for automatic layout of the spread specified in step S408. Details of this processing are described as follows.

Figure 6:
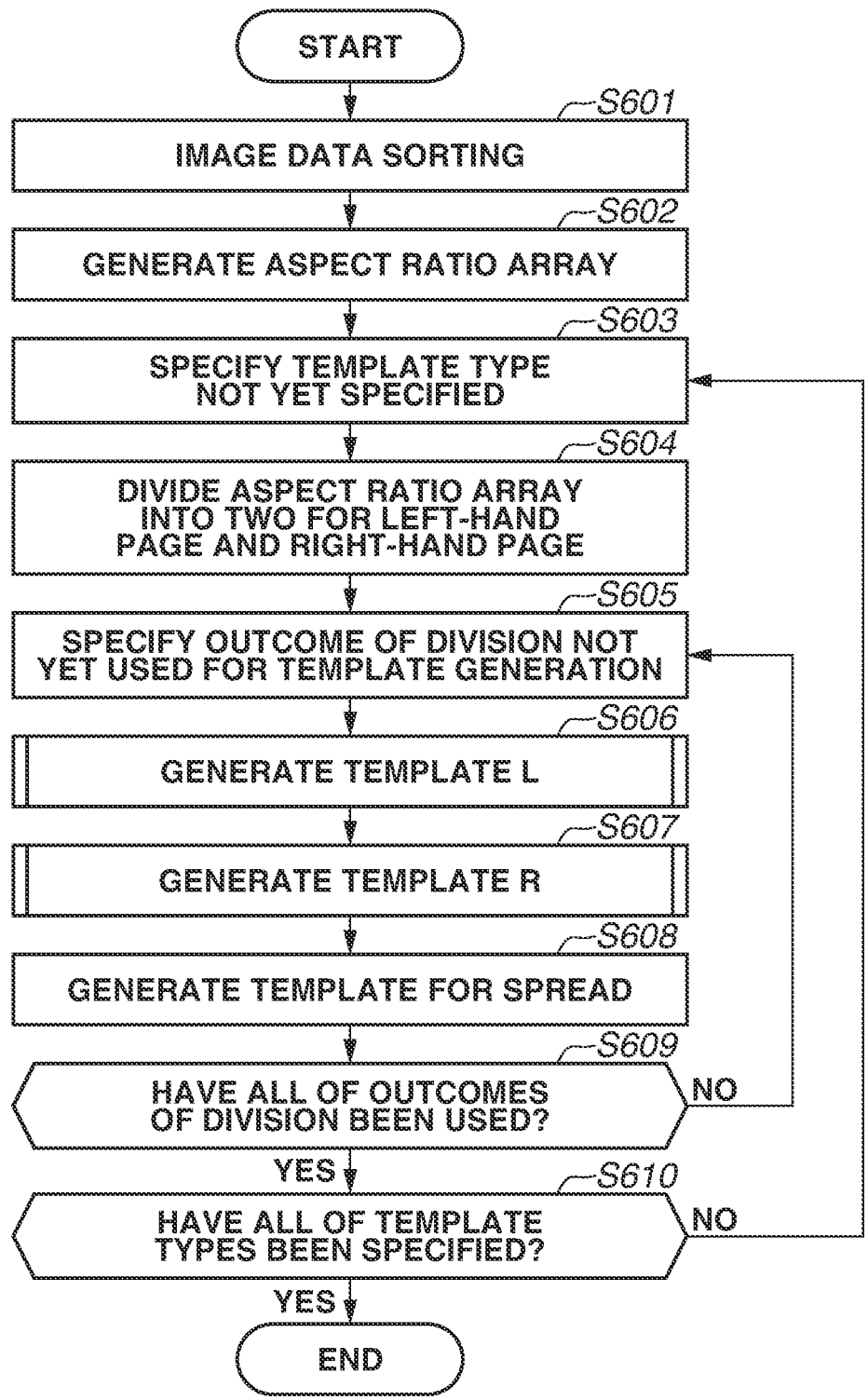
FIG. 6 is a flowchart illustrating template generation processing which is performed by the album creation application.

FIG. 6 is a flowchart illustrating template generation processing which is performed by the album creation application according to the present exemplary embodiment. The flowchart illustrated in FIG. 6 is implemented, for example, by the CPU 101 loading a program corresponding to the album creation application stored in the HDD 104 onto the ROM 102 or the RAM 103 and executing the program. Moreover, the flowchart illustrated in FIG. 6 represents the processing corresponding to step S409.

In step S601, the CPU 101 arranges (sorts) the pieces of image data acquired in step S408 in order of earlier image capturing date and time based on the feature amounts (image capturing dates and times) obtained by analysis performed in step S403.

In step S602, the CPU 101 specifies aspect ratios of the respective pieces of image data arranged in step S601, and thus generates an aspect ratio array. The aspect ratio array is a sequence of values obtained by arranging the specified aspect ratios in a similar way to the arrangement order of the pieces of image data arranged in step S601. In the present exemplary embodiment, the aspect ratio is assumed to be "the height of an image represented by image data/the width of the image represented by image data". Furthermore, in a case where there is a variation in aspect ratio between the respective pieces of image data, a great-looking template may not be generated in template generation processing described below. Therefore, here, the CPU 101 performs processing for preventing or reducing the variation in aspect ratio between the respective pieces of image data. Specifically, the CPU 101 calculates the number N_1 of pieces of image data in each of which the value of "the length of the short side of an image represented by image data/the length of the long side of the image represented by image data" is greater than or equal to "(2/3+3/4)/2" and less than 1. Moreover, the CPU 101 calculates the number N_s of pieces of image data in each of which the value of "the length of the short side of an image represented by image data/the length of the long side of the image represented by image data" is less than "(2/3+3/4)/2". Then, in the case of N_s<N_1, the CPU 101 substitutes the aspect ratio of image data the aspect ratio of which is less than 1 with 3/4 and substitutes the aspect ratio of image data the aspect ratio of which is greater than 1 with 4/3. On the other hand, in the case of not N_s<N_1, the CPU 101 substitutes the aspect ratio of image data the aspect ratio of which is less than 1 with 2/3 and substitutes the aspect ratio of image data the aspect ratio of which is greater than 1 with 3/2. Furthermore, the CPU 101 maintains, without any change, the aspect ratio of image data the aspect ratio of which is 1. With this processing, for example, in a case where there are five pieces of image data allocated to a spread specified in step S408, an aspect ratio array such as {1, 1, 1, 4/3, 3/4} is acquired.

In step S603, the CPU 101 specifies a template type which is not yet specified. In the present exemplary embodiment, templates of types such as those illustrated in FIGS. 10A, 10B, 10C, 10D, 10E, and 10F are generated by the template generation processing. In FIGS. 10A to 10F, the centerline of each template is a line equivalent to the centerline of a spread, and is thus a line equivalent to the binding portion of an album. Furthermore, while, in FIGS. 10A to 10F, the forms in which slots are previously arranged are illustrated, which slot is arranged in an arrangement region indicated by a thick dashed line is determined by processing which is performed in a later stage. Templates to be generated by the template generation processing include, for example, a type of template in which such a slot as to straddle a right-hand page and a left-hand page is allowed to be arranged and a type of template in which such a slot as to straddle a right-hand page and a left-hand page is not allowed to be arranged. Moreover, the templates include, for example, a type of template in which no slot is arranged in a left-hand page and a slot is arranged only in a right-hand page. Moreover, the templates include, for example, a type of template having a large quantity of blank areas and a type of template having a small quantity of blank areas. Moreover, the templates include, for example, a type of template having not only a slot the shape of which is determined based on features of image data to be used but also a fixed slot the size, position, and shape of which are previously determined. In the present exemplary embodiment, the CPU 101 specifies a template type which is not yet specified out of the template types illustrated in FIGS. 10A to 10F Furthermore, the template types illustrated in FIGS. 10A to 10F are merely examples, and other types of templates can be specified. Moreover, a template type to be specified can be changed based on the album creation condition. For example, in a case where the binding style of an album is saddle stitching or interleaving paper binding, even if there is an image which straddles a right-hand page and a left-hand page of a spread, the visibility of such an image does not decrease. Therefore, in a case where the binding style of an album is saddle stitching or interleaving paper binding, a type of template having a slot which straddles a right-hand page and a left-hand page of a spread can be used. On the other hand, in a case where the binding style of an album is adhesive binding or side stitching, since the visibility of an image which straddles a right-hand page and a left-hand page of a spread decreases, it is not favorable that a type of template having a slot which straddles a right-hand page and a left-hand page of a spread is used. Therefore, for example, in a case where the binding style of an album is adhesive binding or side stitching, the CPU 101 performs control in such a manner that a template type which may include such a slot as to straddle a right-hand page and a left-hand page of a spread (for example, template types illustrated in FIGS. 10B, 10D, and 10E) is not specified in step S603. Furthermore, in a case where the binding style of an album is saddle stitching or interleaving paper binding, all of the template types are targeted for being specified. Moreover, a template type to be specified can be changed based on the page number of a spread. For example, in a specific page of an album, a background image is assumed to be arranged. Then, a type of template which is arranged in a page in which the background image is arranged is assumed to be controlled to be a specific type of template (for example, a type such as that illustrated in FIG. 10A). In that case, here, only a specific type of template can be controlled to be targeted for being specified.

In step S604, the CPU 101 divides the aspect ratio array acquired in step S602 based on the template type specified in step S603, and thus generates an aspect ratio array L and an aspect ratio array R. Furthermore, in the present exemplary embodiment, in the template generation processing, two templates (a template L and a template R) are automatically generated, so that a template generated by combining the two templates and a template generated from only one template are generated. The former template is, for example, a type of template illustrated in FIG. 10A, and the latter template is, for example, a type of template illustrated in any one of FIGS. 10B to 10F Then, in the case of generating a layout image with use of a type of template illustrated in FIG. 10A, the CPU 101 divides pieces of image data allocated to the spread specified in step S408 into two sets of pieces of image data, and then arranges one set of pieces of image data in the template L and arranges the other set of pieces of image data in the template R. Therefore, in a case where the type illustrated in FIG. 10A has been specified in step S603, the CPU 101 divides the aspect ratio array into two halves and thus acquires the outcome of division. More specifically, for example, in a case where the aspect ratio array acquired in step S602 is {1, 1,4/3, 3/4}, an aspect ratio array L which is {1, 1} and an aspect ratio array R which is {4/3, 3/4} are obtained as the outcome of division. Furthermore, at this time, a plurality of outcomes of division can be acquired. Specifically, for example, not only an outcome of division obtained by dividing the aspect ratio array into two halves but also an outcome of division obtained by, after dividing the aspect ratio array into two halves, transferring one to three aspect ratios from one aspect ratio array to the other aspect ratio array can be acquired. Moreover, in the case of generating a layout image with use of any one of the types of templates illustrated in FIGS. 10B to 10F, the CPU 101 arranges all of the pieces of image data allocated to the spread specified in step S408 into one template. Therefore, in a case where the type illustrated in any one of FIGS. 10B to 10F has been specified in step S603, the CPU 101 allocates all of the aspect ratios to the aspect ratio array L and allocates no aspect ratio to the aspect ratio array R, thus acquiring the outcome of division. More specifically, for example, in a case where the aspect ratio array acquired in step S602 is {1, 1, 4/3, 3/4}, as the outcome of division, an aspect ratio array L which is {1, 1, 4/3, 3/4} is acquired and an aspect ratio array R which is { } is also acquired. Furthermore, while, mainly, the aspect ratio array L is an aspect ratio array for a left-hand page in the spread specified in step S408, a template which is generated based on the aspect ratio array L may be arranged in a spread including a right-hand page or including both a left-hand page and a right-hand page. Moreover, the aspect ratio array R is an aspect ratio array for a right-hand page in the spread specified in step S408.

In step S605, the CPU 101 specifies any outcome of division which is not yet used for template generation out of the outcomes of division acquired in step S604.

In step S606, the CPU 101 generates a template L based on the outcome of division specified in step S605. The template L is mainly equivalent to a template for a left-hand page in the spread specified in step S408, but is not limited to this and may be equivalent to a template for a right-hand page or a template for a spread.

In step S607, the CPU 101 generates a template R based on the outcome of division specified in step S605. The template R is equivalent to a template for a right-hand page in the spread specified in step S408. Details of processing performed in steps S606 and S607 are described as follows.

Figure 7:
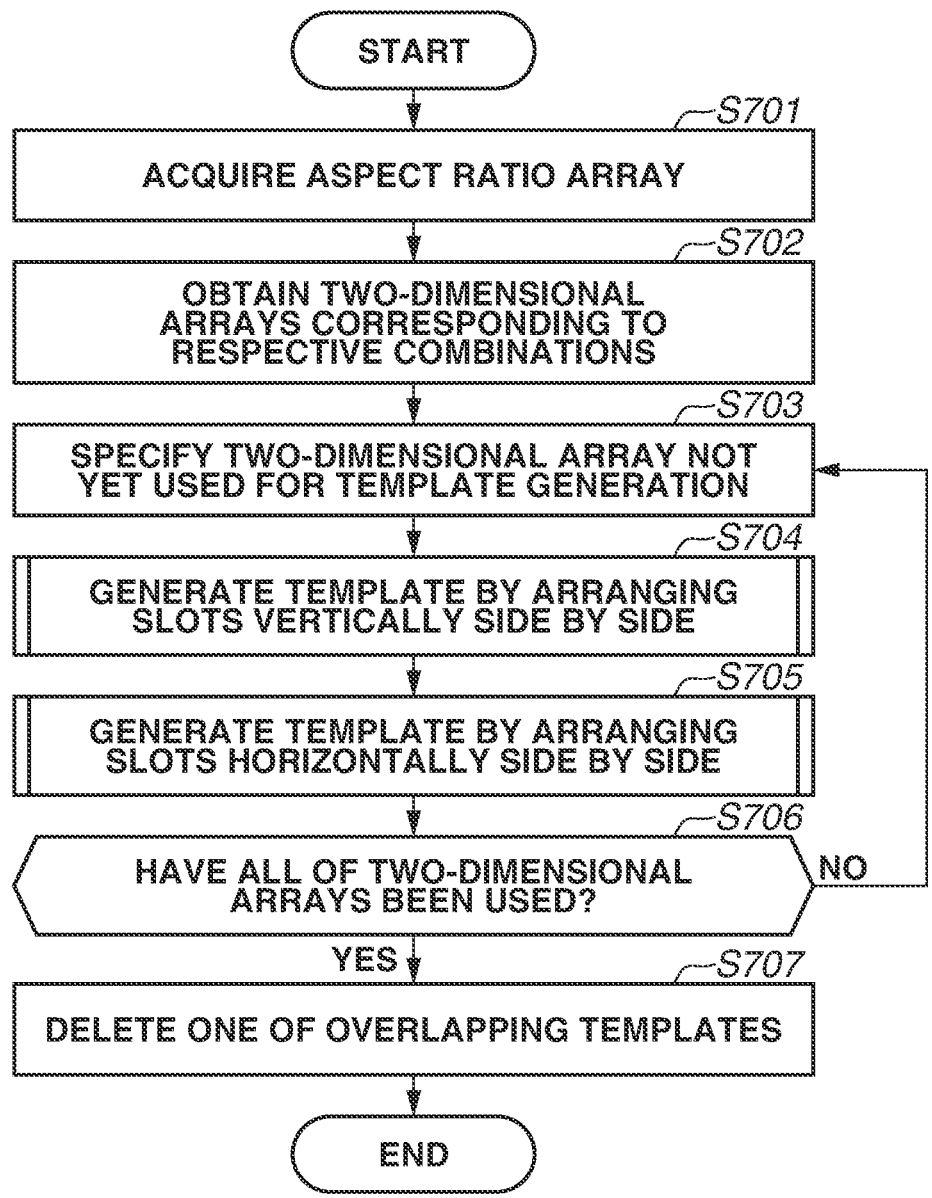
FIG. 7 is a flowchart illustrating processing for generating a template L or a template R which is performed by the album creation application.

FIG. 7 is a flowchart illustrating processing for generating the template L or the template R, which is performed by the album creation application according to the present exemplary embodiment. The flowchart illustrated in FIG. 7 is implemented, for example, by the CPU 101 loading a program corresponding to the album creation application stored in the HDD 104 onto the ROM 102 or the RAM 103 and executing the program. Moreover, the flowchart illustrated in FIG. 7 represents the processing corresponding to step S606 or S607.

In step S701, the CPU 101 acquires one aspect ratio array out of the outcomes of division specified in step S605. If the present processing is directed to processing performed in step S606, the aspect ratio array L is acquired, and, if the present processing is directed to processing performed in step S607, the aspect ratio array R is acquired.

In step S702, the CPU 101 calculates all of the combinations of values included in the aspect ratio array acquired in step S701, and then obtains two-dimensional arrays corresponding to the respective combinations. When the number of pieces of image data to be arranged in the template L is assumed to be N, it results in that $2^{(N-1)}$ patterns of two-dimensional arrays are generated. More specifically, for example, in a case where the aspect ratio array L is $\{1, 1, 1\}$, it results in that four patterns $\{\{1, 1, 1\}\}$, $\{\{1\}, \{1, 1\}\}$, $\{\{1, 1\}, \{1\}\}$, and $\{\{1\}, \{1\}, \{1\}\}$ of two-dimensional arrays are acquired. Each one-dimensional array included in a two-dimensional array is equivalent to the aspect ratio of image data arranged in each column in a template. Furthermore, in the present exemplary embodiment, the processing performed in steps S703 to S706 is repeated a number of times corresponding to the number of two-dimensional arrays acquired at this time. In a case where a huge number of two-dimensional arrays have been acquired due to the number N of pieces of image data being large, repetition of the processing in steps S703 to S706 may spend much time. Therefore, for example, the CPU 101 can delete a part of the two-dimensional arrays acquired at this time, thus reducing a time required for repetition of the processing in steps S703 to S706. Specifically, for example, the CPU 101 can delete a two-dimensional array in which the number of aspect ratios included in at least one one-dimensional array is less than or equal to $|N/10|$.

In step S703, the CPU 101 specifies a two-dimensional array which is not yet used for template generation out of a plurality of two-dimensional arrays acquired in step S702.

In step S704, the CPU 101 generates a template L by arranging slots vertically side by side based on the two-dimensional array acquired in step S703. Details of the present processing are described as follows.

Figure 8A:
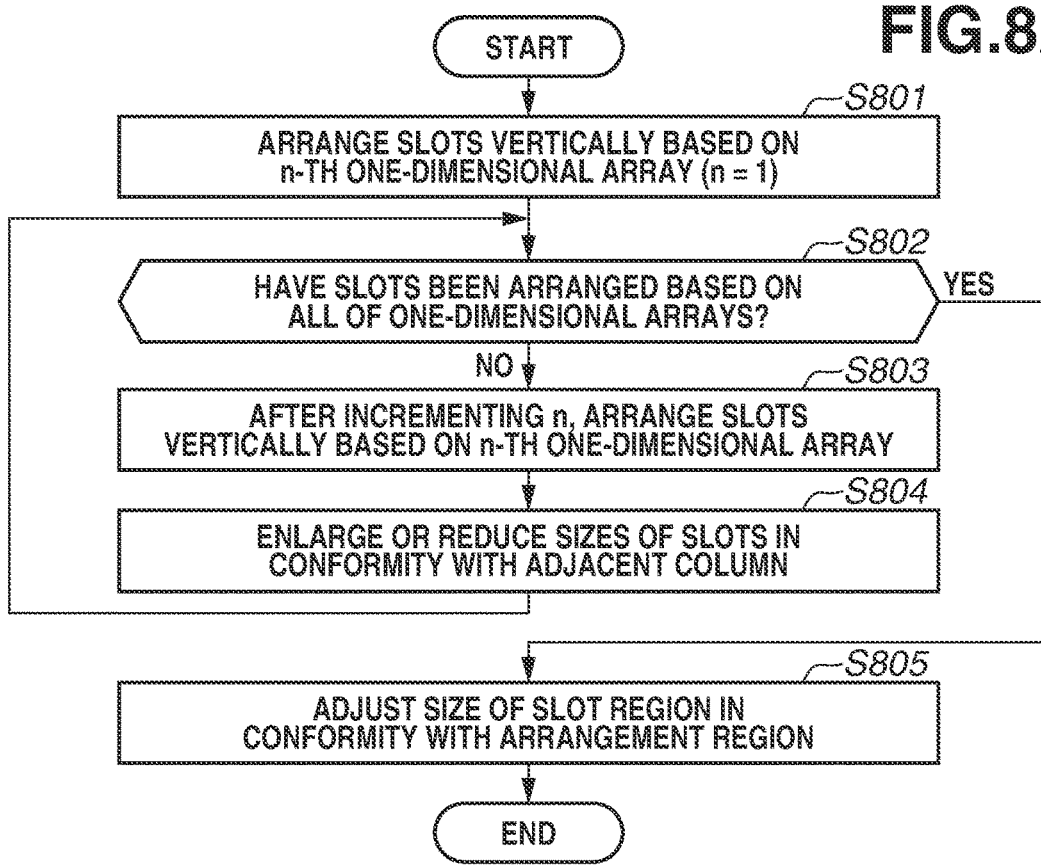
FIGS. 8A and 8B are flowcharts illustrating template generation processing for vertical side-by-side arrangement and horizontal side-by-side arrangement, respectively, which is performed by the album creation application.

FIG. 8A is a flowchart illustrating template generation processing using vertical side-by-side arrangement, which is performed by the album creation application according to the present exemplary embodiment. The flowchart illustrated in FIG. 8A is implemented, for example, by the CPU 101 loading a program corresponding to the album creation application stored in the HDD 104 onto the ROM 102 or the RAM 103 and executing the program. Moreover, the flowchart illustrated in FIG. 8A represents the processing corresponding to step S704.

In step S801, the CPU 101 arranges, in order starting with the top, slots of the respective aspect ratios included in the n-th one-dimensional array of the two-dimensional array acquired in step S703, thus generating a slot region. Furthermore, since the initial value of n is 1, here, it results in that slots of the respective aspect ratios included in the first one-dimensional array are arranged in the slot region. Furthermore, a blank space with a predetermined width d is provided between slots. Moreover, at this time, the CPU 101 enlarges or reduces the slots without changing the aspect ratios thereof in such a manner that the widths of the respective added slots become equal to each other. Specifically, the CPU 101 enlarges or reduces the slots in such a manner that the widths of the respective added slots become a previously determined given width. For example, in a case where the two-dimensional array acquired in step S703 is $\{\{4/3, 3/4\}, \{4/3, 3/4, 3/4\}\}$, since the first one-dimensional array is $\{4/3, 3/4\}$, it results in that the slots are arranged in a slot region as illustrated in FIG. 9A1.

In step S802, the CPU 101 determines whether arrangement of the slots has been performed based on all of the one-dimensional arrays included in the two-dimensional array acquired in step S703. If the result of determination is NO (NO in step S802), the CPU 101 advances the processing to step S803, and, if the result of determination is YES (YES in step S802), the CPU 101 advances the processing to step S805.

In step S803, after incrementing the value of n, the CPU 101 arranges, in order starting with the top, slots of the respective aspect ratios included in the n-th one-dimensional array of the two-dimensional array acquired in step S703 in a column adjacent on the right side of the slots arranged in step S801. In a case where the two-dimensional array acquired in step S703 is $\{\{4/3, 3/4\}, \{4/3, 3/4, 3/4\}\}$, since the second one-dimensional array is $\{4/3, 3/4, 3/4\}$, it results in that the slots are arranged in a slot region as illustrated in FIG. 9A2.

In step S804, the CPU 101 enlarges or reduces the sizes of slots included in the column added in step S803, without changing the aspect ratios thereof, in such a manner that the height of the column added in step S803 becomes equal to the height of the column adjacent on the left side of the column added in step S803. In a case where the two-dimensional array acquired in step S703 is $\{\{4/3, 3/4\}, \{4/3, 3/4, 3/4\}\}$, at this time, it results in that the slots are arranged in a slot region as illustrated in FIG. 9A3. After that, the CPU 101 advances the processing to step S802 again.

In step S805, the CPU 101 enlarges or reduces the slot region generated by the processing in steps S801 to S804 in conformity with the arrangement region in the type of template specified in step S603. With this processing, it results in that the slot region is enlarged or reduced as illustrated in FIG. 9A4. Then, the CPU 101 arranges the enlarged or reduced slot region in the arrangement region. Furthermore, in a case where the present processing is processing in the generation processing for the template L, the slot region is enlarged or reduced in conformity with the arrangement region of the template L and is then arranged in the arrangement region of the template L. On the other hand, in a case where the present processing is processing in the generation processing for the template R, the slot region is enlarged or reduced in conformity with the arrangement region of the template R and is then arranged in the arrangement region of the template R. In this way, with the vertical side-by-side arrangement, the template L or the template R is generated.

Moreover, after arranging the slot region in the arrangement region to generate the template L or the template R, the CPU 101 can adjust the size of a slot included in the template L or the template R. The reason for this is described as follows.

For example, in the actual course of creation of an album, a process of printing a layout image on a sheet of paper larger than the size of a spread and, after printing, cutting the sheet of paper into the size of the spread may be included. Furthermore, at this time, some errors may be observed in the cutting position of the sheet. Therefore, for example, in a case where, in cutting a spread with a layout image printed thereon in which slots are arranged alongside the edge of a template, the cutting position deviates outside the spread, a blank space which should not be originally present may occur between an image in the slot and the edge of the spread.

Moreover, for example, when a slot is situated in the vicinity of the edge of a template and a blank space with a narrow width occurs between the edge of the slot and the edge of the template, even during printing, naturally, a blank space with a narrow width also occurs in the edge portion of the spread. However, a layout image in which a blank space with a narrow width occurs is not favorable in terms of aesthetic property.

As mentioned above, depending on positions of slots, an inappropriate album may be obtained. Therefore, in the present exemplary embodiment, in a case where the edge of a slot is situated alongside the edge of a template or a case where the edge of a slot is situated near the edge of a template, the CPU 101 enlarges the size of the slot.

Figure 11:
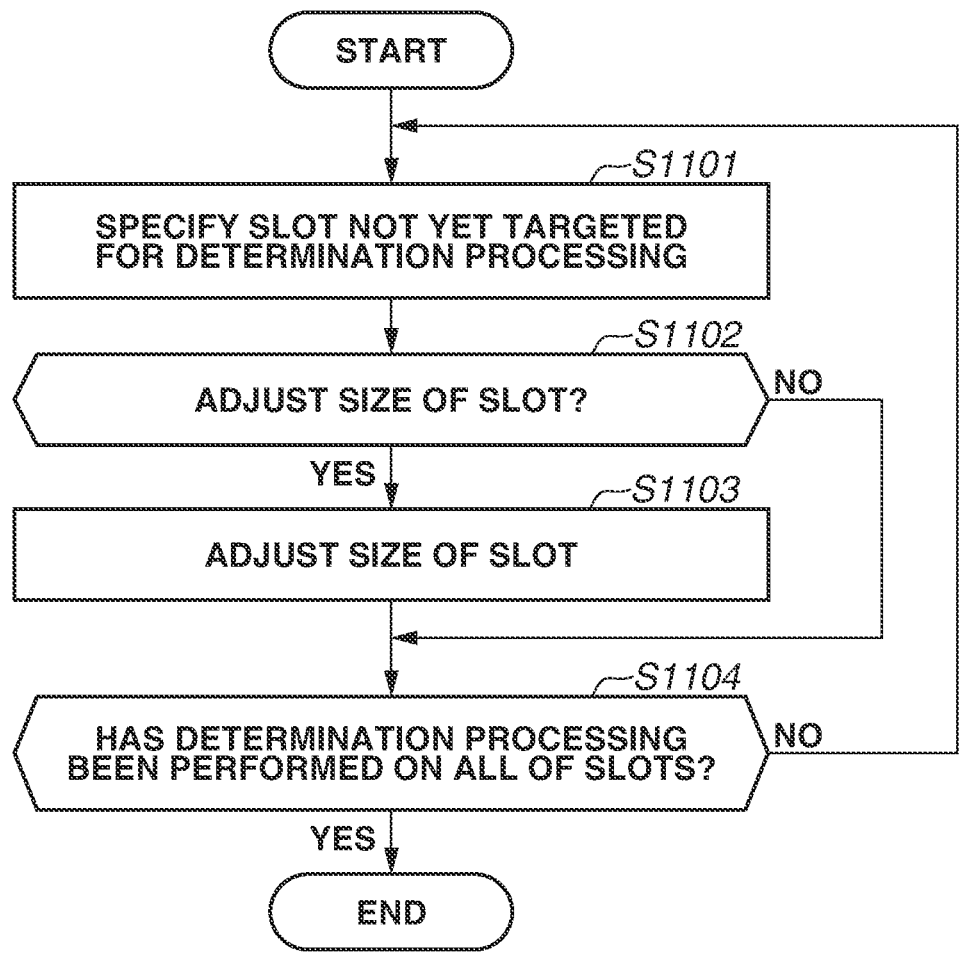
FIG. 11 is a flowchart illustrating slot adjustment processing which is performed by the album creation application.

Specifically, after arranging a slot region in an arrangement region to generate the template L (or the template R), the CPU 101 performs processing illustrated in FIG. 11. FIG. 11 is a flowchart illustrating slot adjustment processing, which is performed by the album creation application according to the present exemplary embodiment. The flowchart illustrated in FIG. 11 is implemented, for example, by the CPU 101 loading a program corresponding to the album creation application stored in the HDD 104 onto the ROM 102 or the RAM 103 and executing the program. Moreover, the flowchart illustrated in FIG. 11 is started after the slot region is arranged in the arrangement region. While, in the following description, processing performed in a case where the template L has been generated is described, in a case where the template R has been generated, the processing is assumed to be performed with respect to, instead of the template L, the template R.

In step S1101, the CPU 101 specifies a slot which is not yet targeted for determination processing in a subsequent stage out of the slots included in the generated template L. Then, the CPU 101 specifies the position in the template L of the specified slot.

In step S1102, the CPU 101 determines whether to adjust the size of the slot specified in step S1101. Specifically, the CPU 101 determines whether a specific side which is a side of the slot specified in step S1101 and is also a side approximately parallel to a predetermined side of the template L is situated within a predetermined distance of the predetermined side of the template L. Furthermore, in the present exemplary embodiment, the CPU 101 adjusts the size of the slot not only in a case where the predetermined side is located near the inside of the template L but also in a case where the predetermined side is located near the outside of the template L. If the result of determination is YES (YES in step S1102), the CPU 101 advances the processing to step S1103, and, if the result of determination is NO (NO in step S1102), the CPU 101 advances the processing to step S1104.

Figure 12A:
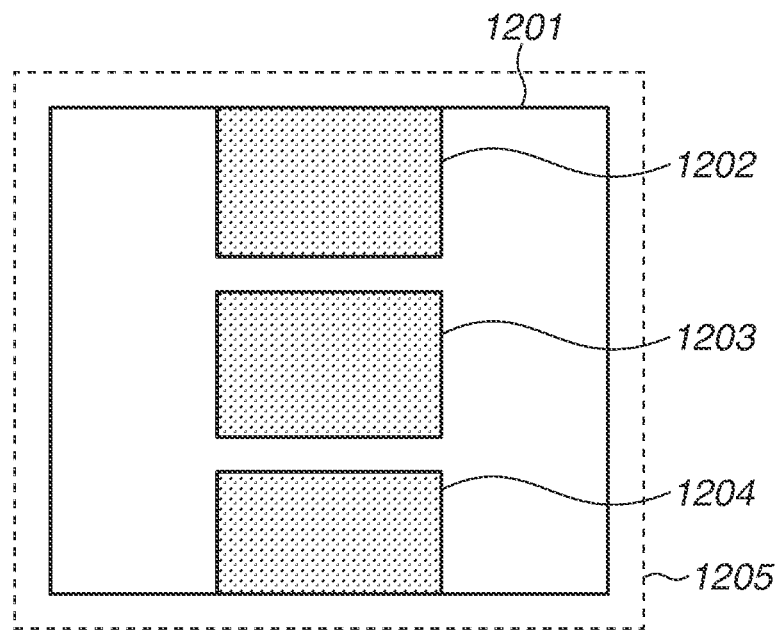
FIGS. 12A and 12B are diagrams used to explain adjustment of slots.
Figure 12B:
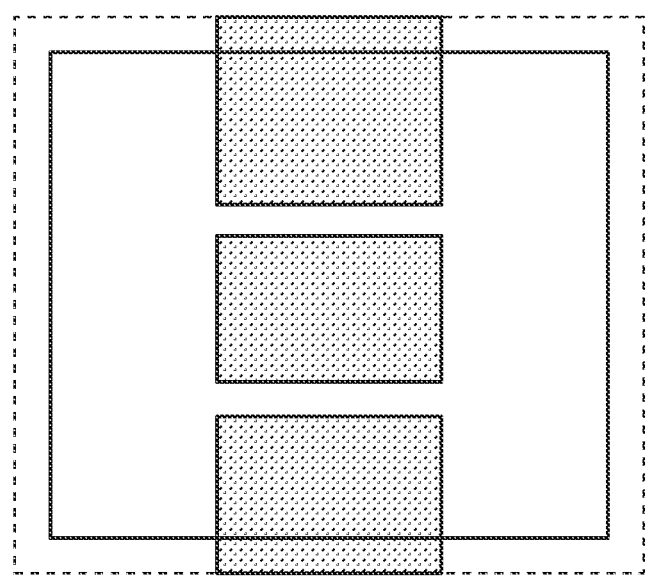

In step S1103, the CPU 101 adjusts the size of the slot specified in step S101. Specifically, the CPU 101 enlarges the slot by moving the position of a specific side of the slot to a region outside the template L. More specifically, for example, suppose that the generated template L is a template 1201 illustrated in FIG. 12A. In that case, a slot 1202 and a slot 1204 each of which is situated in a position near the edge of the template L are enlarged, so that a template such as that illustrated in FIG. 12B is generated. Furthermore, naturally, a slot 1203, which is not situated in a position near the edge of the template L, is not enlarged. A region 1205 is a region which is set in consideration of the magnitude of an error of the cutting position occurring during album creation, and, in a case where a slot is adjusted, it results in that a specific side of the slot is moved to the position of the region 1205. This enables preventing or reducing a blank space from occurring, even if an error of the cutting position occurs during album creation. Moreover, printing is assumed to be performed in a region in which a slot is arranged even if the region is outside a template. Furthermore, while, here, the CPU 101 extends each slot in only one direction, in a case where a slot is situated near a plurality of sides of the template, the CPU 101 can extend the slot in a plurality of directions.

In step S104, the CPU 101 determines whether determination processing has been performed on all of the slots, and, if the result of determination is YES (YES in step S1104), the CPU 101 ends the slot adjustment processing and then advances the processing to step S705, and, if the result of determination is NO (NO in step S1104), the CPU 101 returns the processing to step S101.

In step S705, the CPU 101 generates a template by arranging slots horizontally side by side based on the two-dimensional array acquired in step S703. Details of the present processing are described as follows.

Figure 8B:
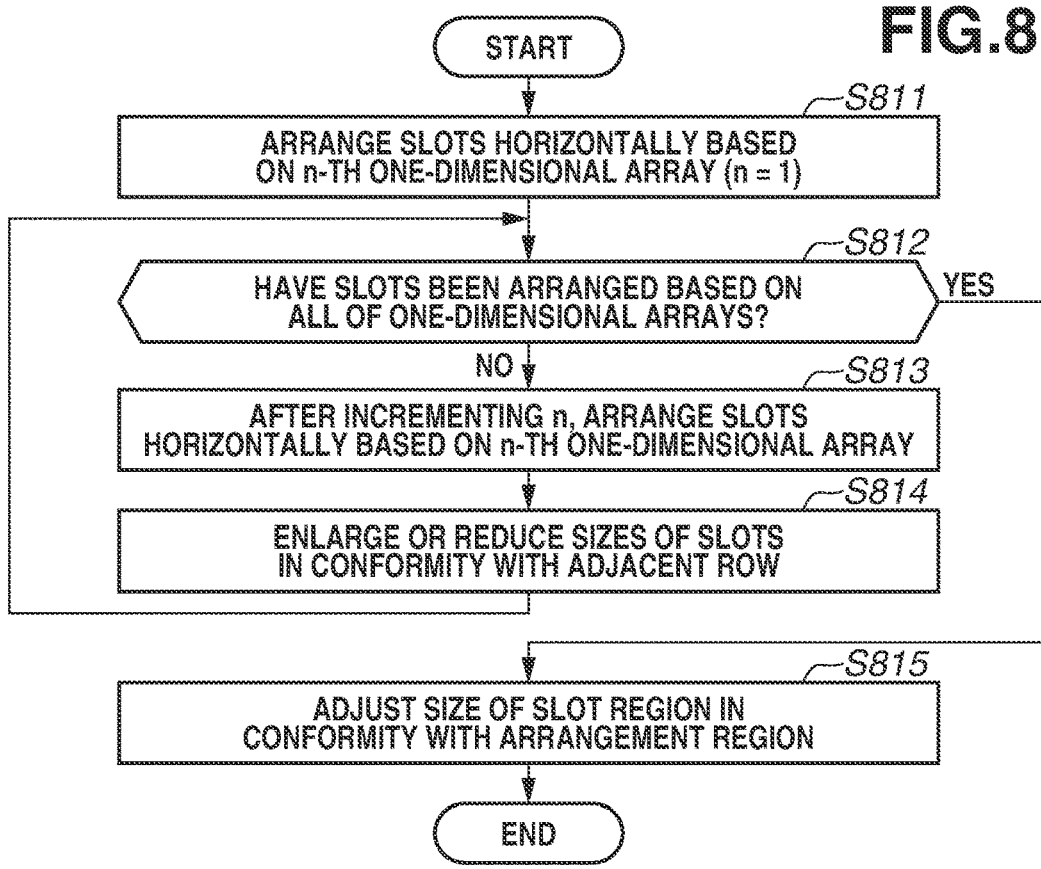

FIG. 8B is a flowchart illustrating template generation processing using horizontal side-by-side arrangement, which is performed by the album creation application according to the present exemplary embodiment. The flowchart illustrated in FIG. 8B is implemented, for example, by the CPU 101 loading a program corresponding to the album creation application stored in the HDD 104 onto the ROM 102 or the RAM 103 and executing the program. Moreover, the flowchart illustrated in FIG. 8B represents the processing corresponding to step S705.

In step S811, the CPU 101 arranges, in order starting with the left, slots of the respective aspect ratios included in the n-th one-dimensional array of the two-dimensional array acquired in step S703, thus generating a slot region. Furthermore, since the initial value of n is 1, here, it results in that slots of the respective aspect ratios included in the first one-dimensional array are arranged in the slot region. Furthermore, a blank space with a predetermined width d is provided between slots. Moreover, at this time, the CPU 101 enlarges or reduces the slots without changing the aspect ratios thereof in such a manner that the heights of the respective added slots become equal to each other. Specifically, the CPU 101 enlarges or reduces the slots in such a manner that the heights of the respective added slots become a previously determined given height. For example, in a case where the two-dimensional array acquired in step S703 is {{4/3, 3/4}, {4/3, 3/4, 3/4}}, since the first one-dimensional array is {4/3, 3/4}, it results in that the slots are arranged in a slot region as illustrated in FIG. 9B1.

In step S812, the CPU 101 determines whether arrangement of the slots has been performed based on all of the one-dimensional arrays included in the two-dimensional array acquired in step S703. If the result of determination is NO (NO in step S812), the CPU 101 advances the processing to step S813, and, if the result of determination is YES (YES in step S812), the CPU 101 advances the processing to step S815.

In step S813, after incrementing the value of n, the CPU 101 arranges, in order starting with the left, slots of the respective aspect ratios included in the n-th one-dimensional array of the two-dimensional array acquired in step S703 in a row below the row of the slots arranged in step S811. In a case where the two-dimensional array acquired in step S703 is {{4/3, 3/4}, {4/3, 3/4, 3/4}}, since the second one-dimensional array is {4/3, 3/4, 3/4}, it results in that the slots are arranged in a slot region as illustrated in FIG. 9B2.

In step S814, the CPU 101 enlarges or reduces the sizes of slots included in the row added in step S813, without changing the aspect ratios thereof, in such a manner that the width of the row added in step S813 becomes equal to the width of the row above the row added in step S813. In a case where the two-dimensional array acquired in step S703 is {{4/3, 3/4}, {4/3, 3/4, 3/4}}, at this time, it results in that the slots are arranged in a slot region as illustrated in FIG. 9B3. After that, the CPU 101 advances the processing to step S812 again.

In step S815, the CPU 101 enlarges or reduces the slot region generated by the processing in steps S811 to S814 in conformity with the arrangement region in the type of template specified in step S603. With this processing, it results in that the slot region is enlarged or reduced as illustrated in FIG. 9B4. Then, the CPU 101 arranges the enlarged or reduced slot region in the arrangement region. Furthermore, in a case where the present processing is processing in the generation processing for the template L, the slot region is enlarged or reduced in conformity with the arrangement region of the template L and is then arranged in the arrangement region of the template L. On the other hand, in a case where the present processing is processing in the generation processing for the template R, the slot region is enlarged or reduced in conformity with the arrangement region of the template R and is then arranged in the arrangement region of the template R. In this way, with the horizontal side-by-side arrangement, the template L or the template R is generated. After that, the CPU 101 ends the template generation processing using horizontal side-by-side arrangement, and then advances the processing to step S706.

Furthermore, as in the present exemplary embodiment, generating templates by both a method using vertical side-by-side arrangement and a method using horizontal side-by-side arrangement enables generating a plurality of templates respectively different in the number of slot columns and a plurality of templates respectively different in the number of slot rows.

In step S706, the CPU 101 determines whether template generation has been performed based on all of the two-dimensional arrays. If the result of determination is YES (YES in step S706), the CPU 101 advances the processing to step S707, and, if the result of determination is NO (NO in step S706), the CPU 101 returns the processing to step S703, thus specifying a new two-dimensional array.

In step S707, the CPU 101 specifies whether there are overlapping templates out of the templates generated in step S704 and the templates generated in step S705. Then, if there are overlapping templates, the CPU 101 deletes one of the overlapping templates.

When the template R and the template L have been generated in the above-described way, the CPU 101 advances the processing to step S608.

Figure 10A:
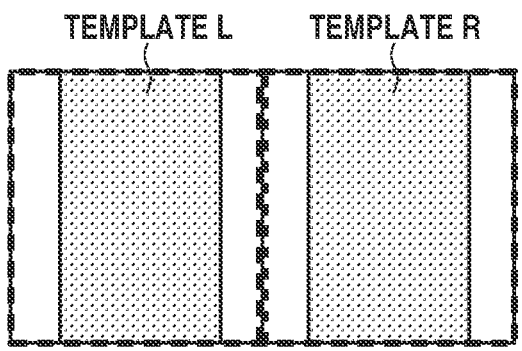
FIGS. 10A, 10B, 10C, 10D, 10E, and 10F are diagrams illustrating examples of templates for spreads to be generated.

In step S608, the CPU 101 generates a template for spread. For example, suppose that the CPU 101 has generated a template L and a template R the template type of which specified in step S603 is a type in which a slot straddling a right-hand page and a left-hand page is not arranged. In that case, the CPU 101 combines the template L and the template R to generate a template for spread. In the above-described way, for example, a template for spread such as that illustrated in FIG. 10A is generated. At this time, in a case where a plurality of templates L and a plurality of templates R have been generated, the CPU 101 combines each of the plurality of templates L with a respective one of the plurality of templates R. Thus, with the present processing performed, it results in that templates for spread the number of which corresponds to a number obtained by "the numbers of templates L"×"the number of templates R" are generated.

Figure 10B:
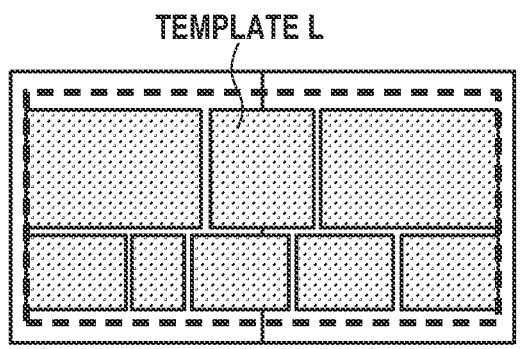
Figure 10C:
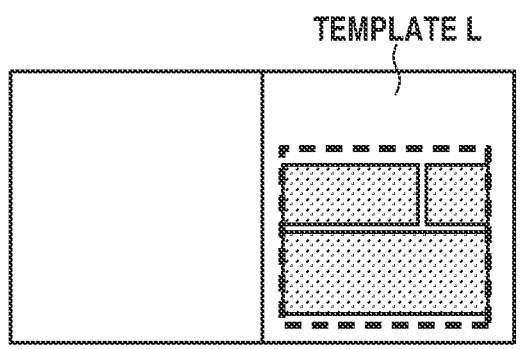
Figure 10D:
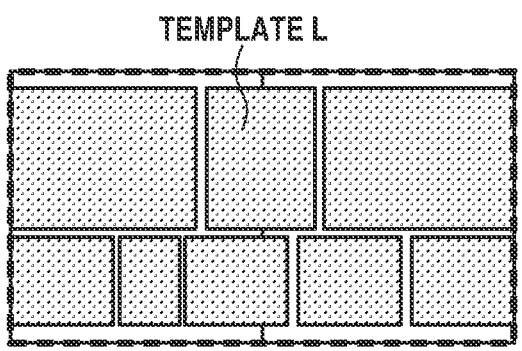

Moreover, for example, suppose that the template type specified in step S603 is a type of template in which a slot straddling a right-hand page and a left-hand page is allowed to be arranged and which does not include a fixed slot. Moreover, for example, suppose that the template type specified in step S603 is a type of template in which no slot is arranged in a left-hand page and a slot or slots are arranged in only a right-hand page. In that case, since only a template L has been generated, the CPU 101 generates the template L as a template for spread. In the above-described way, for example, a template for spread such as that illustrated FIG. 10B, 10C, or 10D is generated.

Figure 10E:
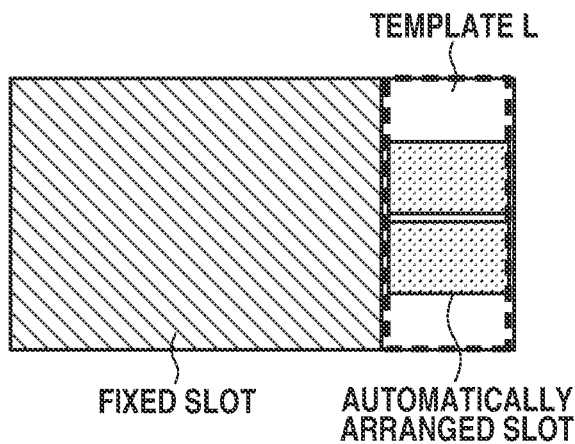
Figure 10F:
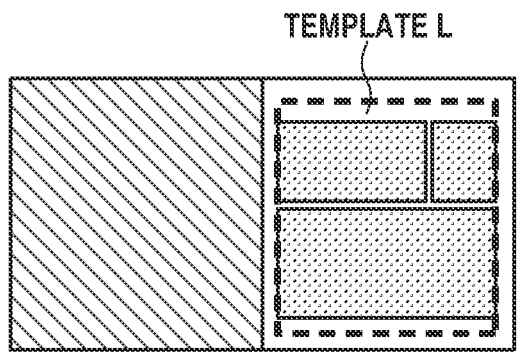

Moreover, for example, suppose that the template type specified in step S603 is a type of template which includes a fixed slot. In that case, since only a template L has been generated, the CPU 101 combines the template L with the fixed slot to generate a template for spread. In the above-described way, for example, a template for spread such as that illustrated FIG. 10E or 10F is generated.

In step S609, the CPU 101 determines whether all of the outcomes of division have been used for template generation. If the result of determination is YES (YES in step S609), the CPU 101 advances the processing to step S610, and, if the result of determination is NO (NO in step S609), the CPU 101 returns the processing to step S605, thus performing template generation using a template which is not yet specified.

In step S610, the CPU 101 determines whether all of the template types have been specified. If the result of determination is YES (YES in step S610), the CPU 101 ends the template generation processing, and, if the result of determination is NO (NO in step S610), the CPU 101 returns the processing to step S603, thus specifying a template which is not yet specified.

When, in the above-described way, the template generation processing has been completed, the CPU 101 advances the processing to step S410.

In step S410, the CPU 101 performs template scoring. The template scoring is processing (scoring) for assigning a score to the template generated in step S409. Details of the present processing are described as follows. In the present exemplary embodiment, scoring is performed based on blank areas (areas other than slots) in a template and each slot included in the template.

First, in the present exemplary embodiment, the CPU 101 performs scoring that is based on blank areas with use of the following formula (1). Furthermore, the blank area is an area other than slots in a template.

$$SCORE_a = \begin{cases} 1 & (AREA_s > THR_{au}) \\ 0 & (AREA_s < THR_{al}) \\ \dfrac{AREA_s - THR_{al}}{THR_{au} - THR_{al}} & (\text{otherwise}) \end{cases} \quad (1)$$

Here, SCOREa is a score that is based on blank areas, AREAs is the total area of slots included in the template, and THRau and THRal are threshold values used to obtain a score that is based on blank areas. In a case where AREAs is greater than THRau, SCOREa becomes 1. Moreover, in a case where AREAs is less than THRal, SCOREa becomes 0. In a case where AREAs is greater than or equal to THRal and is less than or equal to THRau, SCOREa becomes a value close to 1 as AREAs is greater, and SCOREa becomes a value close to 0 as AREAs is less. Thus, according to the above-mentioned formula, as the total area of slots is larger (in other words, the total area of blank areas is less), a higher score is able to be assigned to the template.

Figure 13B:
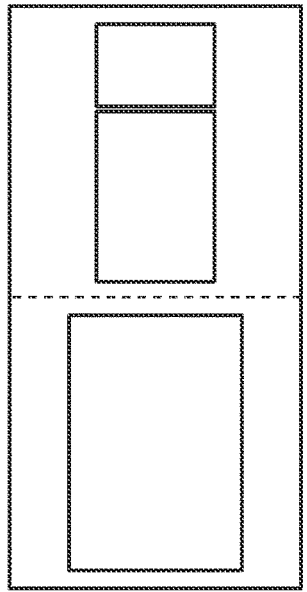
FIGS. 13A, 13B, 13C, 13D, 13E, and 13F are diagrams used to explain respective types of templates.
Figure 13D:
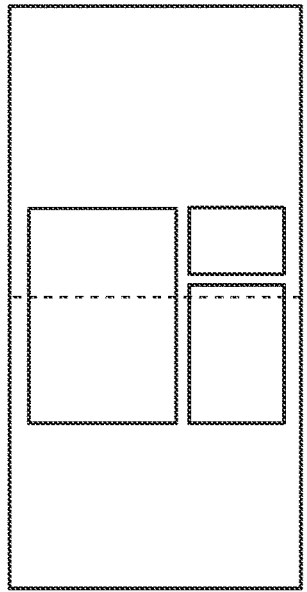
Figure 13F:
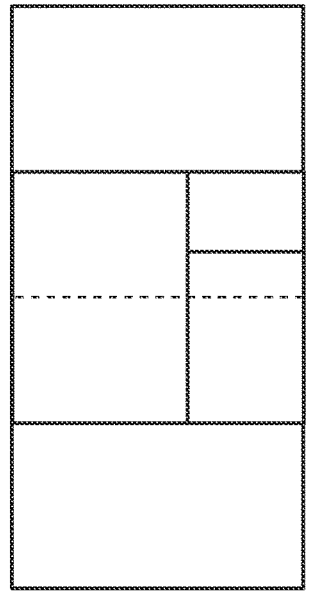
Figure 13A:
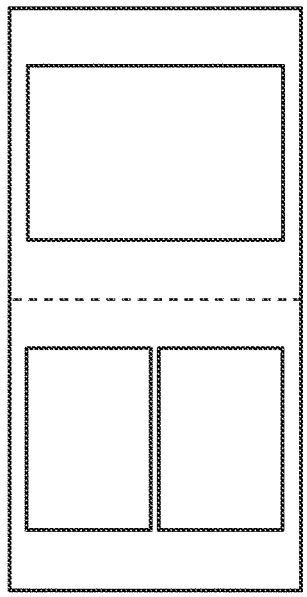
Figure 13C:
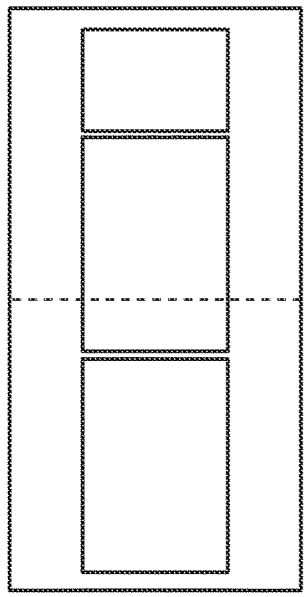
Figure 13E:
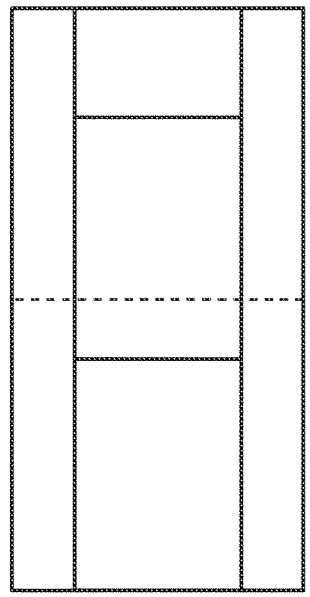

Furthermore, a method of scoring that is based on blank areas is not limited to the above-mentioned method. For example, in the above description, the CPU 101 assigns a score to a template for spread. However, for example, in a case where a template targeted for evaluation includes a template L and a template R, the CPU 101 can assign respective scores to the template L and the template R and then assign an average score thereof to a template for spread. Moreover, the CPU 101 can control scoring according to the position of a blank area. For example, suppose that there are a template in which blank spaces are present in an upper portion and a lower portion of the inside of the template and the shape of which is horizontally long (for example, FIG. 13E) and a template in which blank spaces are present in a left-hand portion and a right-hand portion of the inside of the template and the shape of which is horizontally long (for example, FIG. 13F). In this case, even if the respective total areas of blank spaces are the same, it becomes recognized by the user that the quantity of blank spaces in the latter template is larger than the quantity of blank spaces in the former template. Therefore, control can be performed in such a manner that the threshold value THRau used for scoring of a template in which blank spaces are present in an upper portion and a lower portion of the inside of the template becomes larger than the threshold value THRau used for scoring of a template in which blank spaces are present in a left-hand portion and a right-hand portion of the inside of the template. Moreover, control can be performed in such a manner that the threshold value THRal used for scoring of a template in which blank spaces are present in an upper portion and a lower portion of the inside of the template becomes larger than the threshold value THRal used for scoring of a template in which blank spaces are present in a left-hand portion and a right-hand portion of the inside of the template. With this control, even if the total area of blank spaces of a template in which blank spaces are present in a left-hand portion and a right-hand portion of the inside of the template and the total area of blank spaces of a template in which blank spaces are present in an upper portion and a lower portion of the inside of the template are equal to each other, control is performed in such a manner that a score of the former template becomes greater than a score of the latter template.

Next, the CPU 101 performs scoring that is based on slots with use of the following formulae (2) and (3).

$$SCORE_g = \begin{cases} 1 & (RATIO_s < THR_{gl}) \\ 0 & (RATIO_s > THR_{gu}) \\ \dfrac{THR_{gu} - RATIO_s}{THR_{gu} - THR_{gl}} & (\text{otherwise}) \end{cases} \quad (2)$$

$$RATIO_s = \frac{AREA_s/N_s}{AREA_m} \quad (3)$$

Ns is the total number of slots included in a template, and AREAm is the area of the smallest slot out of the slots included in the template. Thus, RATIOs is the ratio of an average value of the areas of the slots included in the template to the area of the smallest slot out of the slots included in the template.

SCOREg is a score that is based on slots, and THRgu and THRgl are threshold values used to obtain a score that is based on slots. In a case where RATIOs is greater than THRgu, SCOREg becomes 0. Moreover, in a case where RATIOs is less than THRgl, SCOREg becomes 1. In a case where RATIOs is greater than or equal to THRgl and is less than or equal to THRgu, SCOREg becomes a value close to 1 as RATIOs is smaller, and SCOREg becomes a value close to 0 as RATIOs is larger. Thus, according to the above-mentioned formulae, as a difference between the area of the smallest slot out of the slots included in the template and the average value of the areas of the slots included in the template is smaller, a higher score is able to be assigned to the template.

After that, the CPU 101 calculates an average value of the scores SCOREa and SCOREg, and assigns, to the template, the calculated average value as a template score, which is the final score. This enables performing scoring with respect to a template in terms of a plurality of viewpoints.

For example, suppose that four pieces of image data each representing an image with an aspect ratio of 2/3 are selected as pieces of image data to be arranged in a spread specified in step S408 and six templates such as those illustrated in FIGS. 14A1, 14A2, 14A3, 14A4, 14A5, and 14A6 have been generated in step S409. In that case, for example, the scores assigned to the respective templates are managed by the CPU 101 in such a manner as illustrated in FIG. 14B. In this example, the template scores of a template illustrated in FIG. 14A1 and a template illustrated in FIG. 14A4 are the highest, and the template score of a template illustrated in FIG. 14A6 is the lowest.

Furthermore, while, in the present exemplary embodiment, the CPU 101 uses an average value of the scores SCOREa and SCOREg as a template score, the present exemplary embodiment is not limited to this. The CPU 101 can add weight to at least one of the scores SCOREa and SCOREg and use an average value of the weighted scores SCOREa and SCOREg as a template score. Moreover, for example, the CPU 101 can use the lower one of the scores SCOREa and SCOREg as a template score.

Moreover, to calculate a template score, the CPU 101 can refer to the score SCOREa and a score other than the score SCOREg. For example, the CPU 101 can refer to a score SCOREm, which is a score corresponding to a margin between slots. A layout image in which the position of a margin in a column is too near the position of a margin in the adjoining column is not favorable in terms of aesthetic property. Therefore, the CPU 101 can calculate a distance between margins in a template and assign the score SCOREm according to the calculated distance. Specifically, for example, the CPU 101 calculates a distance between a margin in a given column and a margin in a column adjacent to the given column (for example, a distance 1401 or a distance 1402 illustrated in FIG. 14C). Then, the CPU 101 assigns the score SCOREm according to the magnitude of the calculated distance. For example, the value of the score SCOREm becomes larger as the calculated distance is larger, and becomes smaller as the calculated distance is smaller. Moreover, for example, in a case where a plurality of distances has been calculated as illustrated in FIG. 14C, the CPU 101 calculates the score SCOREm based on an average distance of the calculated plurality of distances.

Figure 15:
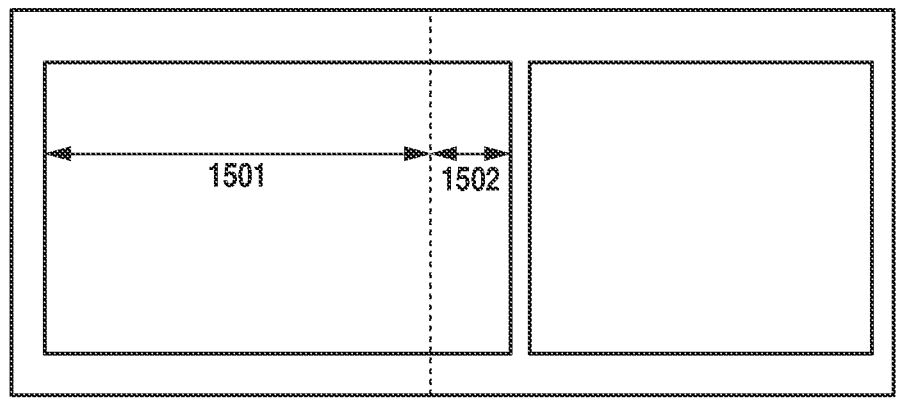
FIG. 15 is a diagram used to explain scoring for a template.

Moreover, for example, the CPU 101 can refer to a score SCOREs, which is a score corresponding to the distance of a side of a slot arranged to straddle the centerline of a spread from the centerline of the spread. For example, a layout image in which, as illustrated in FIG. 15, a side of a slot arranged to straddle the centerline of a spread is too near the centerline of the spread is not favorable in terms of aesthetic property. Therefore, the CPU 101 can calculate a distance of a side of a slot arranged to straddle the centerline of a spread from the centerline of the spread, and then assign the template score SCOREs according to the calculated distance. Specifically, for example, the CPU 101 calculates the distance of the side of the slot from the centerline of the spread (for example, a distance 1501 or a distance 1502 illustrated in FIG. 15). Then, the CPU 101 assigns the score SCOREs according to the magnitude of the calculated distance. For example, the value of the score SCOREs becomes smaller as the calculated distance is less than or equal to a predetermined threshold value, and becomes larger as the calculated distance is larger than the predetermined threshold value.

Furthermore, in a case where the score SCOREa and a score other than the score SCOREg are calculated, the average value of all of the calculated scores is assigned as a template score to a template.

Furthermore, in step S410, the CPU 101 can switch the evaluation method according to the type of a template targeted for evaluation. Specifically, for example, the CPU 101 can switch which of the scores SCOREg, SCOREm, and SCOREs to calculate as well as the score SCOREa according to the type of a template targeted for evaluation. Specifically, for example, with respect to a template in which no slot is arranged to straddle the centerline of a spread, the CPU 101 can assign only the score SCOREg or SCOREm as well as the SCOREa. Then, with respect to a template in which a slot is arranged to straddle the centerline of a spread, the CPU 101 can assign all of the scores. The method of determining the type of a template is described in detail as follows with reference to FIGS. 13A, 13B, 13C, 13D, 13E and 13F.

First, the CPU 101 determines whether a slot included in a template targeted for evaluation is arranged to straddle the centerline of a spread. Specifically, the CPU 101 determines whether all of the four points at the corners of the slot are included in only one of the left-hand page and the right-hand page. If all of the four points at the corners of the slot are included in only one of the left-hand page and the right-hand page, the CPU 101 determines that the template is of a type in which no slot is arranged to straddle the centerline of a spread (for example, types illustrated in FIGS. 13A and 13B). On the other hand, if not all of the four points at the corners of the slot are included in only one of the left-hand page and the right-hand page, the CPU 101 determines that the template is of a type in which a slot is arranged to straddle the centerline of a spread (for example, types illustrated in FIGS. 13C to 13F). Furthermore, in a case where the slot is a polygon other than quadrangles, the CPU 101 determines whether not all of the four points but all of the points corresponding to the corners of the polygon are included in only one of the left-hand page and the right-hand page.

Next, the CPU 101 determines whether a slot included in a template targeted for evaluation is in contact with the edge of the template. Specifically, the CPU 101 determines whether any one of the points at the corners of the slot is situated at the edge of the template or outside the template. If any one of the points at the corners of the slot is situated at the edge of the template or outside the template, the CPU 101 determines that the template is of a type in which a slot is in contact with the edge of a template (for example, types illustrated in FIGS. 13E and 13F). On the other hand, if none of the points at the corners of the slot is situated at the edge of the template or outside the template, the CPU 101 determines that the template is of a type in which no slot is in contact with the edge of a template (for example, types illustrated in FIGS. 13A to 13D). Furthermore, the result of the present determination is used to determine whether to perform the above-mentioned control in which the threshold value THRau used for scoring of a template in which blank spaces are present in an upper portion and a lower portion of the inside of the template and the threshold value THRau used for scoring of a template in which blank spaces are present in a left-hand portion and a right-hand portion of the inside of the template are made different from each other. Specifically, for example, with respect to a type in which a slot is in contact with the edge of a template, the CPU 101 determines to perform the above-mentioned control, and, with respect to a type in which no slot is in contact with the edge of a template, the CPU 101 determines not to perform the above-mentioned control.

In step S411, the CPU 101 selects one or a plurality of templates from among the templates generated in step S409 based on the respective evaluations (scores) assigned in step S410. In the present exemplary embodiment, the CPU 101 selects all of the templates each of which has a template score greater than or equal to a predetermined threshold value out of the templates generated in step S409. Furthermore, in a case where there is no template having a template score greater than or equal to the predetermined threshold value, the CPU 101 selects a template having the highest template score out of the templates generated in step S409. Furthermore, the method of selecting a template or templates is not limited to the above-mentioned method. While, in the above description, the threshold value is a fixed value, for example, a value obtained by subtracting a predetermined value from each template score assigned to a template generated in step S409 can be determined as the threshold value. Moreover, for example, the CPU 101 can select templates up to a predetermined number or proportion thereof in descending order of template score out of the templates generated in step S409.

At this time, the CPU 101 can perform control in such away as to prevent similar templates from being concurrently selected. For example, suppose that a template s1 having the highest template score has been selected from all of the templates. In that case, the CPU 101 deletes all of the templates each having a high degree of similarity to the template s1 from the templates targeted for selection. The degree of similarity is calculated, for example, based on the average value of coordinates of center points of the respective slots included in a template. For example, suppose that the template s1 includes two slots and the coordinates of center points of the respective slots are (1, 5) and (3, 11). In that case, the average value Psi in the template s1 becomes (2, 8). Moreover, the degree of similarity between the template s1 and a template s2, which has the average value $P_{s2}$, is calculated as $|P_{s1}-P_{s2}|$. Then, if $|P_{s1}-P_{s2}|$ is smaller than a predetermined threshold value, the CPU 101 determines that the degree of similarity between the template s1 and the template s2 is high. Then, if $|P_{s1}-P_{s2}|$ is larger than the predetermined threshold value, the CPU 101 determines that the degree of similarity between the template s1 and the template s2 is low. In this way, the CPU 101 specifies a template having a high degree of similarity to the prior selected template and then deletes the specified template. Then, after deleting the template having a high degree of similarity to the prior selected template, the CPU 101 selects a new template. After that, each time selecting a template, the CPU 101 specifies and deletes a template having a high degree of similarity to the prior selected template. Employing such a configuration causes some templates not to be used for generation processing for a layout image and, therefore, enables reducing a time required for generation processing for a layout image.

In step S412, the CPU 101 generates a layout image by arranging pieces of image data allocated to the spread specified in step S408 in the respective slots included in the template selected in step S411. Furthermore, at this time, in a case where a plurality of templates has been selected in step S411, the CPU 101 specifies any template in which pieces of image data are not yet arranged out of the templates specified in step S411. Then, the CPU 101 arranges pieces of image data in the template specified in this way. The method of arranging pieces of image data is described in detail as follows with reference to FIGS. 16A, 16B, 16C, 16D, and 16E.

FIG. 16A illustrates examples of shapes of images represented by the respective pieces of image data to be arranged in the spread specified in step S408. FIG. 16B illustrates an example of a template in which to arrange pieces of image data. FIG. 16C illustrates a table showing information about respective pieces of image data corresponding to the respective images illustrated in FIG. 16A and a table showing information about respective slots included in the template illustrated in FIG. 16B. The information about respective pieces of image data includes, for example, an image number (No.) allocated to each piece of image data and the aspect ratio, score, and image capturing time of each piece of image data. Moreover, the information about respective slots includes, for example, a slot No. allocated to each slot and the aspect ratio, score, and position No. of each slot. Furthermore, while information about the position No. of each slot is expressed by, for example, an integer, a smaller number is allocated to a slot located closer to the left-hand end in a template. First, the CPU 101 sorts the contents of each table based on the aspect ratio. Furthermore, with respect to rows the aspect ratios of which are the same, the CPU 101 controls the alignment sequence in such a manner that a row in which the image capturing time is earlier or a row in which the position number (No.) is smaller is placed in an upper row. With this control, the tables illustrated in FIG. 16C change into tables such as those illustrated in FIG. 16D. After that, the CPU 101 arranges each piece of image data in a slot the row order in table of which is the same as that of such piece of image data. More specifically, in the example illustrated in FIG. 16D, image data the image No. of which is 1 is arranged in a slot the slot No. of which is 2, image data the image No. of which is 2 is arranged in a slot the slot No. of which is 1, and image data the image No. of which is 3 is arranged in a slot the slot No. of which is 3. Furthermore, in the arrangement of image data with respect to a slot, the image data is enlarged or reduced as appropriate in such a manner that at least one side of the image data is in contact with a side of the slot. Moreover, in a case where a portion of the enlarged or reduced image data does not fit into a slot, the portion which does not fit into the slot is trimmed. However, in the present exemplary embodiment, since the shape of a slot is adjusted based on the aspect ratio of image data, the size of the portion to be trimmed can be reduced. As a result, for example, a layout image such as that illustrated in FIG. 16E is generated.

In step S413, the CPU 101 performs scoring of the layout image generated in step S412. The scoring of a layout image is described in detail as follows with reference to FIGS. 17A, 17B, and 17C.

For example, suppose that, in the layout image generation processing in step S412, pieces of image data have been arranged in a template such as that illustrated in FIG. 17A or 17B. Moreover, suppose that the table showing information about respective pieces of image data to be arranged in the spread specified in step S408 is a table 1701 illustrated in FIG. 17C. Moreover, suppose that the table showing information about respective slots of the template 1 illustrated in FIG. 17A is a table 1702 illustrated in FIG. 17C and the table showing information about respective slots of the template 2 illustrated in FIG. 17B is a table 1703 illustrated in FIG. 17C. Furthermore, each table is assumed to be a table previously subjected to sorting as described in step S412. In scoring of a layout image, the CPU 101 calculates the score of a layout image based on a degree of correlation between information about pieces of image data arranged in the layout image and information about slots in which the pieces of image data are arranged. Specifically, first, the CPU 101 calculates a degree of score correlation between the order of a score of each piece of image data and the order of a score of each slot and a degree of positional correlation between the order of the image capturing date and time of each piece of image data and the order of the position of each slot. Then, the CPU 101 assigns the score of the layout image based on the magnitudes of these degrees of correlation. For example, the value of the score of the layout image becomes larger as these degrees of correlation are larger, and becomes smaller as these degrees of correlation are smaller. This is because, for example, out of pieces of image data to be arranged in the spread specified in step S408, a piece of image data having the highest score being arranged in a slot having the highest score makes the aesthetic property of a layout image higher. Moreover, this is because, for example, out of pieces of image data to be arranged in the spread specified in step S408, a piece of image data having the earliest image capturing date and time being arranged in a slot located at the leftmost position makes the aesthetic property of a layout image higher. For example, in the example illustrated in FIGS. 17A to 17C, the degree of score correlation in a layout image with the template 1 used therein and the degree of score correlation in a layout image with the template 2 used therein become the same in value. However, the degree of positional correlation in the layout image with the template 2 used therein becomes higher in value than the degree of positional correlation in the layout image with the template 1 used therein. Therefore, a higher score is assigned to the layout image with the template 2 used therein than to the layout image with the template 1 used therein.

In step S414, the CPU 101 determines whether layout images have been generated based on all of the templates generated in step S409. If the result of determination is YES (YES in step S414), the CPU 101 advances the processing to step S415, and, if the result of determination is NO (NO in step S414), the CPU 101 returns the processing to step S412, thus specifying a template not yet subjected to generation of a layout image and then performing generation of a layout image based on the specified template.

In step S415, the CPU 101 selects, from the layout images generated in step S412, a layout image which is arranged in the spread specified in step S408 and which is displayed and output in the spread display portion 503. In the present exemplary embodiment, the CPU 101 selects a layout image based on the score assigned in step S410 and the score assigned in step S413. Specifically, the CPU 101 selects a layout image in which the sum of the score assigned in step S410 and the score assigned in step S413 is the highest in value. For example, suppose that the score of a template used for generation of a layout image A (the score assigned in step S410) is 70 points and the score of the layout image A (the score assigned in step S413) is 80 points. Moreover, suppose that the score of a template used for generation of a layout image B (the score assigned in step S410) is 90 points and the score of the layout image B (the score assigned in step S413) is 70 points. In that case, the layout image B is selected in priority to the layout image A. Furthermore, the present exemplary embodiment is not limited to this. For example, the CPU 101 can add weight to at least one of the score assigned in step S410 and the score assigned in step S413 and perform main selection while prioritizing any one of the score assigned in step S410 and the score assigned in step S413. Moreover, for example, the CPU 101 can perform main selection based on only one of the score assigned in step S410 and the score assigned in step S413. In this way, out of a plurality of layout images, a layout image which is actually arranged in a spread is specified.

In step S416, the CPU 101 determines whether all of the spreads have been specified and, thus, layout images have been generated with respect to all of the specified spreads. If the result of determination is YES (YES in step S416), the CPU 101 advances the processing to step S417, and, if the result of determination is NO (NO in step S416), the CPU 101 returns the processing to step S408, thus specifying a new spread and then generating a layout image to be arranged in the specified spread.

In step S417, the CPU 101 displays the respective layout images selected in step S415 on the editing screen 501. Specifically, the CPU 101 displays, in the spread list 502, the respective spreads and the layout images arranged in the respective spreads. Then, in a case where any one of the spreads has been selected by the user from the spread list 502, the CPU 101 displays, in the spread display portion 503, the selected spread and a layout image arranged in the selected spread in an enlarged manner, thus bringing about a state which allows the user to perform an editing operation on the selected spread. After that, the CPU 101 ends the automatic layout processing.

Employing the above-described configuration enables generating a layout image with use of an appropriate template.

<Editing of Album Data>

Automatic layout processing which is performed in response to an editing operation for album data being performed on the editing screen 501 is described. For example, in a case where manual generation has been selected as a method of generating album data or in a case where the processing illustrated in FIG. 4 has been completed, the editing screen 501 is displayed. In the state in which the editing screen 501 is displayed, the user is allowed to optionally edit a layout image which is arranged in a spread selected from the spread list 502. Specifically, for example, the user is allowed to perform an edition operation to add one or a plurality of pieces of image data to a layout image which is arranged in a spread selected from the spread list 502 or change one or a plurality of pieces of image data previously arranged in the layout image. In the present exemplary embodiment, not only in the processing illustrated in FIG. 4 but also in a case where a piece or pieces of image data to be arranged in a spread have been added to the spread by the editing operation, automatic layout is performed. Furthermore, in the present exemplary embodiment, in a case where image data previously arranged in the layout image is changed by the editing operation, automatic layout processing is not performed. Thus, as the size, shape, and position of a slot in which image data to be changed has been arranged so far remain unchanged, new image data is arranged in the slot. However, the present exemplary embodiment is not limited to this, and, even in a case where image data previously arranged in a layout image is to be changed, automatic layout processing can be performed. Thus, a layout image can be generated by re-generating a new template based on image data previously arranged and new image data to be arranged by changing, excluding image data to be changed.

Figure 18:
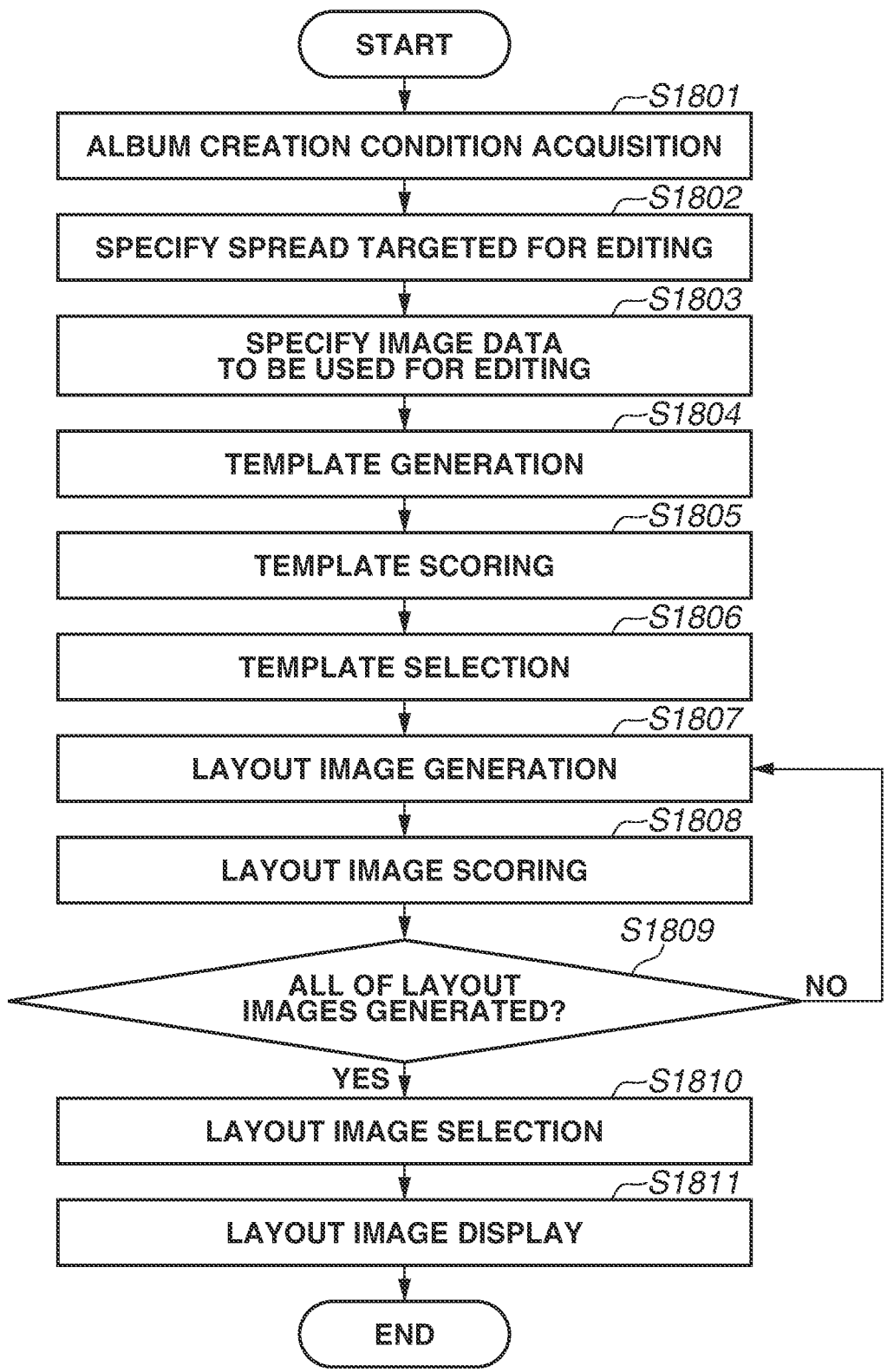
FIG. 18 is a flowchart illustrating automatic layout processing in editing which is performed by the album creation application.

FIG. 18 is a flowchart illustrating automatic layout processing in editing which is performed by the album creation application according to the present exemplary embodiment. The flowchart illustrated in FIG. 18 is implemented, for example, by the CPU 101 loading a program corresponding to the album creation application stored in the HDD 104 onto the ROM 102 or the RAM 103 and executing the program. Moreover, the flowchart illustrated in FIG. 18 is started when an editing operation for album data has been performed on the editing screen 501. The editing operation is specifically, for example, an operation to add image data to be arranged to a spread displayed in the spread display portion 503.

In step S1801, the CPU 101 acquires various pieces of information about an album creation condition input to the input screen 301.

In step S1802, the CPU 101 specifies a spread displayed in the spread display portion 503, as a spread targeted for editing.

In step S1803, the CPU 101 specifies image data to be used for editing.

Specifically, the CPU 101 specifies image data which has been arranged so far in a spread displayed in the spread display portion 503 before the editing operation is received and image data for which an addition instruction has been issued by the editing operation. Furthermore, at the time immediately after an editing screen is displayed in response to manual generation being selected as a method of generating album data, no image data is arranged in the spread. Therefore, in a case where an addition instruction for image data has been issued in the state in which no image data is arranged in the spread, only new image data an addition instruction for which has been issued by the editing operation is specified. Moreover, the CPU 101 acquires a feature amount of the image data specified here.

In step S1804, the CPU 101 generates a template for use in automatic layout for the spread specified in step S1802. While details of the present processing are similar to those of step S409, slightly different portions are described as follows.

In the above-described step S601 in the automatic layout processing which is performed based on an instruction for automatic generation being issued, pieces of image data are lined up in time-series order. However, in step S601 in the automatic layout processing which is performed based on the editing operation, the CPU 101 first lines up pieces of image data which have been arranged so far in the spread, based on the order of arrangement into the spread. After that, the CPU 101 lines up new image data for which an instruction for addition is issued behind the pieces of image data lined up based on the order of arrangement into the spread. Furthermore, the present exemplary embodiment is not limited to this, the CPU 101 can line up pieces of image data anew in time-series order, as with automatic layout processing which is performed based on an instruction for automatic generation being issued.

In step S1805, the CPU 101 performs template scoring. Details of the present processing are similar to those of step S410.

In step S1806, the CPU 101 selects one or a plurality of templates from the templates generated in step S1804 based on the respective evaluations (scores) assigned in step S1805. Details of the present processing are similar to those of step S411.

In step S1807, the CPU 101 generates a layout image by arranging pieces of image data corresponding to the spread specified in step S1802 in the respective slots included in the template selected in step S1806. Details of the present processing are similar to those of step S412.

In step S1808, the CPU 101 performs scoring of the layout image generated in step S1807. Details of the present processing are similar to those of step S413.

In step S1809, the CPU 101 determines whether layout images have been generated based on all of the templates generated in step S1804. If the result of determination is YES (YES in step S1809), the CPU 101 advances the processing to step S1810, and, if the result of determination is NO (NO in step S1809), the CPU 101 returns the processing to step S1807, thus specifying a template not yet subjected to generation of a layout image and performing generation of a layout image based on the specified template.

In step S1810, the CPU 101 selects, from the layout images generated in step S1807, a layout image which is arranged in the spread specified in step S1802. Details of the present processing are similar to those of step S415.

In step S1811, the CPU 101 displays the layout image selected in step S1810 in the spread display portion 503.

Employing the above-described configuration enables generating a layout image with use of an appropriate template even in the automatic layout processing which is performed based on an editing operation.

Moreover, in the present exemplary embodiment, the editing screen 501 is configured to be able to display, in the candidate display region 506, candidates for a template which is usable for editing of a layout image displayed in the spread display portion 503. Then, the user is allowed to select any template from among the candidates to change a layout image displayed in the spread display portion 503 to a layout image for which the selected template is used. For example, templates which are used for the layout images which have been generated in step S412 or S1807 but have not been selected in step S415 or S1810 are displayed as the candidates for a template. Furthermore, at this time, for example, templates which are used for the layout images which have been generated in step S412 or S1807 but have not been selected in step S415 or S1810 can be displayed in sequence in descending order of score thereof. Moreover, for example, out of templates which are used for the layout images which have been generated in step S412 or S1807 but have not been selected in step S415 or S1810, templates having high scores can be extracted. Then, control can be performed in such a manner that, due to such extraction, only templates having higher scores are displayed and templates having lower scores are not displayed. Moreover, for example, templates other than the templates which are used for the layout images which have been generated in step S412 or S1807 but have not been selected in step S415 or S1810 can be displayed. Specifically, for example, not templates which have been automatically generated based on features of image data selected by the user but templates which are previously retained by the album creation application can be displayed. Moreover, for example, in a case where, in step S411, some templates have been deleted according to determination of the degree of similarity, such templates can be controlled not to be displayed in the candidate display region 506. This enables preventing or reducing a plurality of similar candidates for a template from being arranged in the candidate display region 506. The user is allowed to select any template from among the templates displayed in the candidate display region 506 to change a layout image displayed in the spread display portion 503 to a layout image for which the selected template is used. At this time, in a case where the user has selected a template which is used for the layout image which has been generated in step S412 or S1807 but has not been selected in step S415 or S1810, since the layout image has previously been generated, the CPU 101 displays the previously generated layout image. However, in a case where the user has selected a template previously retained by the album creation application, the CPU 101 performs automatic layout processing using the selected template to display a layout image.

Furthermore, not candidates for a template but pieces of layout information (in other words, candidates for layout information) generated by automatic layout processing being performed with use of candidates for a template can be displayed in the candidate display region 506. In that case, it results in that the layout images which have been generated in step S412 or S1807 but have not been selected in step S415 or S1810 are displayed in the candidate display region 506.

Furthermore, the user is allowed to switch the mode of the editing screen 501 from an automatic editing mode to a manual editing mode by performing a predetermined operation, such as pressing a button (not illustrated) in the editing screen 501. The automatic editing mode is a mode in which, in a case where addition of image data has been performed on a spread, the processing illustrated in FIG. 18 is performed so that a layout image is automatically generated. The manual editing mode is a mode in which, in a case where addition of image data has been performed on a spread, the arrangement position and size of the added image data are manually designated by the user so that a layout image is generated. The user is allowed to perform switching of these modes to select a desired editing method.

Furthermore, in a case where a layout image to be arranged in each spread has been edited in the above-described way, layout information is also edited to become layout information used to output the edited layout image. The user is allowed to press the order button 505 after performing editing, to order an album that is based on the edited layout information.

In this way, even after automatic layout processing is performed, the user is allowed to edit album data or layout information as appropriate.

The present disclosure is not limited to the above-described exemplary embodiment. For example, while, in the above-described exemplary embodiment, a configuration in which the above-mentioned image selection processing is used for the automatic layout processing for an album has been described, for example, a configuration in which the above-mentioned image selection processing is used for, for example, a presentation function for automatically presenting image data targeted for printing to the user can also be employed. In other words, the above-mentioned image selection processing can also be performed by a program which performs the presentation function. Moreover, for example, the present disclosure can also be applied to a configuration in which a single sheet of printed product is created. In this case, for example, the CPU 101 can regard one spread in the above-described exemplary embodiment as a single sheet of printed product to perform processing. Moreover, since, usually, only one piece of image data is laid out in a single sheet of printed product, only one slot is assumed to be included in a template for a single sheet of printed product. Furthermore, as long as a configuration in which the number of sheets of printed product for each scene is able to be set is employed, the CPU 101 can regard one spread in the above-described exemplary embodiment as a set number of single sheets of printed product to perform processing.

Moreover, while, in the above-described exemplary embodiment, in template generation processing, a plurality of templates corresponding to features of image data is generated with respect to one spread or page, the present exemplary embodiment is not limited to this. For example, a configuration in which only one template is generated with respect to one spread or page can be employed. In that configuration, for example, scoring of a template does not need to be performed.

Moreover, while, in the above-described exemplary embodiment, in template generation processing, the shape of a slot is determined according to features of image data so that a template suitable for the image data is generated, the present exemplary embodiment is not limited to this. For example, the position or size of a slot in a template can be determined according to features of image data. Specifically, for example, a template can be generated by performing control in such a manner that a slot in which image data representing a large-size image is arranged is arranged on the left-hand page in a template. Moreover, for example, control can be performed in such a manner that the size of a slot in which image data representing a large-size image is arranged becomes larger than the size of a slot in which image data representing a small-size image is arranged.

Moreover, while, in the above-described exemplary embodiment, in generation processing for a layout image in the automatic layout processing, only a new template generated according to features of image data is used, the present exemplary embodiment is not limited to this. A layout image can be generated by using not only the new generated template but also a template previously retained by the album creation application.

Moreover, while, in the above-described exemplary embodiment, after a plurality of templates is generated based on features of image data, a plurality of layout images is generated by arranging pieces of image data in the respective slots included in each of the plurality of templates. Then, any layout image is specified from among the plurality of layout images based on the scores of the respective templates, and the specified layout image is displayed. However, the present exemplary embodiment is not limited to this, and, for example, before layout images are generated, one or a plurality of templates can be specified based on the scores of the respective templates and one or a plurality of layout images can be generated by using only the specified template or templates. With this configuration, in a case where a plurality of layout images has been generated, any one of the plurality of layout images is specified in the way described in step S415 as a layout image which is displayed and output in the spread display portion 503. Furthermore, in specifying such a layout image, only the scores of the respective templates can be referred to or do no need to be referred to (in other words, only the scores of the respective layout images can be referred to).

Furthermore, while, in the above-described exemplary embodiment, slots included in a new template generated based on features of image data are arranged in such a manner that the slots do not overlap each other, the present exemplary embodiment is not limited to this, and the slots can be arranged in such a manner that respective parts of the slots overlap each other.

Moreover, while, in the above-described exemplary embodiment, evaluation (scoring) is performed on only a new template generated based on features of image data, the present exemplary embodiment is not limited to this. For example, in a configuration in which automatic layout processing is performed with use of templates previously retained by the album creation application, evaluation can be performed on the templates previously retained by the album creation application. Then, a layout image to be output can be specified by referring to evaluation of the templates.

Moreover, while, in the above-described exemplary embodiment, a configuration in which the image processing apparatus which performs automatic layout processing is an image processing apparatus present in a local environment has been described, for example, the image processing apparatus which performs automatic layout processing can be an image processing apparatus on a network server. In this case, the user uploading image data onto the image processing apparatus enables the image processing apparatus to perform automatic layout processing.

While, in the above-described exemplary embodiment, various evaluations such as image scoring, template scoring, and layout image scoring are performed by assigning scores, the present exemplary embodiment is not limited to this. Thus, evaluations can be performed without use of scores, and, for example, a configuration in which evaluations of "⊚", "○", "Δ", and "x" are assigned in descending order of evaluation and, for example, scene classification or image selection is performed based on the assigned evaluations can be employed.

The above-described exemplary embodiments can also be implemented by performing the following processing. More specifically, software (program) for implementing the functions of the above-described exemplary embodiments is supplied to a system or apparatus via a network or any type of storage medium, and a computer (or a CPU or micro processing unit (MPU)) of the system or apparatus reads out and executes the program to perform the processing. Moreover, the program can be executed by a single computer or can be executed by a plurality of computers operating in conjunction with each other. Moreover, not all of the above-described processing operations need to be implemented by software, but a part or all of the above-described processing operations can be implemented by hardware such as an application specific integrated circuit (ASIC). Moreover, the CPU includes not only a single CPU performing all of the processing operations but also a plurality of CPUs performing the processing operations in cooperation with each other as appropriate.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-146637 filed Aug. 8, 2019, which is hereby incorporated by reference herein in its entirety.

What is claimed is:

1. A control method for an image processing apparatus, the control method comprising:
    specifying one or a plurality of pieces of image data by the image processing apparatus;
    evaluating a plurality of templates by the image processing apparatus;
    generating a plurality of layout images by arranging the specified one or plurality of pieces of image data with respect to one or a plurality of slots included in each of the plurality of templates by the image processing apparatus;
    specifying at least one layout image from the plurality of layout images at least based on the evaluations of the plurality of templates by the image processing apparatus; and
    outputting the specified at least one layout image by the image processing apparatus,
    wherein the plurality of templates includes a first template and a second template, and
    wherein, in evaluating the plurality of templates, the first template and the second template are evaluated so that evaluation of the second template is higher than evaluation of the first template based on a blank area included in the first template being larger than a blank area included in the second template.

2. The control method according to claim 1, wherein the outputting the specified at least one layout image includes displaying the specified at least one layout image as a displayed layout image.

3. The control method according to claim 2, further comprising receiving an editing operation on the displayed layout image.

4. The control method according to claim 3,
    wherein, after receiving the editing operation, display a set of candidate templates for editing the displayed layout image, and
    wherein the set of candidate templates are from the evaluated plurality of templates other than the second template that are high in evaluation and are not from the evaluated plurality of templates that are low in evaluation.

5. The control method according to claim 4, wherein, the set of candidate templates are displayed in sequence in descending order of the evaluation.

6. A control method for an image processing apparatus, the control method comprising:
    specifying one or a plurality of pieces of image data by the image processing apparatus;
    evaluating a plurality of templates by the image processing apparatus;
    generating a plurality of layout images by arranging the specified one or plurality of pieces of image data with respect to one or a plurality of slots included in each of the plurality of templates by the image processing apparatus;
    specifying at least one layout image from the plurality of layout images at least based on the evaluations of the plurality of templates by the image processing apparatus; and
    outputting the specified at least one layout image by the image processing apparatus,
    wherein the plurality of templates includes a first template and a second template, and
    wherein, based on a blank area included in the first template being present at a left-hand portion and a right-hand portion inside the first template and a blank area included in the second template being present at an upper portion and a lower portion inside the second template, and even if a size of the blank area included in the first template and a size of the blank area included in the second template are equal to each other, the first template and the second template are evaluated so that evaluation of the second template is higher than evaluation of the first template.

7. The control method according to claim 6, wherein the outputting the specified at least one layout image includes displaying the specified at least one layout image as a displayed layout image.

8. The control method according to claim 7, further comprising receiving an editing operation on the displayed layout image.

9. The control method according to claim 8,
wherein, after receiving the editing operation, display a set of candidate templates for editing the displayed layout image, and
wherein the set of candidate templates are from the evaluated plurality of templates other than the second template that are high in evaluation and are not from the evaluated plurality of templates that are low in evaluation.

10. The control method according to claim 9, wherein the set of candidate templates are displayed in sequence in descending order of the evaluation.

11. A control method for an image processing apparatus, the control method comprising:
specifying one or a plurality of pieces of image data by the image processing apparatus;
evaluating a plurality of templates by the image processing apparatus;
generating a plurality of layout images by arranging the specified one or plurality of pieces of image data with respect to one or a plurality of slots included in each of the plurality of templates by the image processing apparatus;
specifying at least one layout image from the plurality of layout images at least based on the evaluations of the plurality of templates by the image processing apparatus; and
outputting the specified at least one layout image by the image processing apparatus,
wherein the plurality of templates includes a first template and a second template,
wherein the first template includes a first margin and a second margin as a margin between slots included in the first template,
wherein the second template includes a third margin and a fourth margin as a margin between slots included in the second template, and
wherein, based on a distance between the first margin and the second margin being shorter than a distance between the third margin and the fourth margin, the first template and the second template are evaluated so that evaluation of a blank area included in the second template is higher than evaluation of a blank area included in the first template.

12. The control method according to claim 11, wherein the outputting the specified at least one layout image includes displaying the specified at least one layout image as a displayed layout image.

13. The control method according to claim 12, further comprising receiving an editing operation on the displayed layout image.

14. The control method according to claim 13,
wherein, after receiving the editing operation, display a set of candidate templates for editing the displayed layout image, and
wherein the set of candidate templates are from the evaluated plurality of templates other than the second template that are high in evaluation and are not from the evaluated plurality of templates that are low in evaluation.

15. The control method according to claim 14, wherein the set of candidate templates are displayed in sequence in descending order of the evaluation.

* * * * *